(12) United States Patent
Beers et al.

(10) Patent No.: US 11,844,402 B2
(45) Date of Patent: *Dec. 19, 2023

(54) COMPACT MOTORIZED TENSIONING DEVICE FOR FOOTWEAR

(71) Applicant: NIKE, Inc., Beaverton, OR (US)

(72) Inventors: Tiffany A. Beers, Portland, OR (US);
Ryan Frederick, Seattle, WA (US);
Clayton Lindsay, Portland, OR (US);
Austin J. Orand, Portland, OR (US);
Andrew A. Owings, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,637

(22) Filed: Sep. 21, 2021

(65) Prior Publication Data

US 2022/0000221 A1 Jan. 6, 2022

Related U.S. Application Data

(63) Continuation of application No. 16/346,646, filed as application No. PCT/US2017/062190 on Nov. 17, 2017, now Pat. No. 11,154,119.

(60) Provisional application No. 62/424,287, filed on Nov. 18, 2016.

(51) Int. Cl.
*A43C 7/08* (2006.01)
*B65H 75/44* (2006.01)
*F16D 11/10* (2006.01)
*A43C 11/16* (2006.01)

(52) U.S. Cl.
CPC ............. *A43C 7/08* (2013.01); *A43C 11/165* (2013.01); *B65H 75/4486* (2013.01); *F16D 11/10* (2013.01); *B65H 2403/721* (2013.01)

(58) Field of Classification Search
CPC ..... A43C 7/08; A43C 11/165; B65H 75/4486; B65H 2403/721; F16D 11/10
See application file for complete search history.

(56) References Cited

U.S. PATENT DOCUMENTS

| 7,096,559 B2 | 8/2006 | Johnson |
| 7,096,659 B1 | 8/2006 | Hatamiya et al. |
| 11,154,119 B2 | 10/2021 | Beers et al. |
| 2006/0053659 A1 | 3/2006 | Johnson |
| 2007/0261270 A1 | 11/2007 | Nadel et al. |

(Continued)

FOREIGN PATENT DOCUMENTS

| CN | 103153112 | 6/2013 |
| CN | 103381003 | 11/2013 |

(Continued)

OTHER PUBLICATIONS

"International Application Serial No. PCT US2017 062190, International Search Report dated Mar. 12, 2018", 3 pgs.

(Continued)

*Primary Examiner* — William E Dondero
(74) *Attorney, Agent, or Firm* — Schwegman, Lundberg & Woessner, P.A.

(57) ABSTRACT

A tensioning system for articles of footwear and articles of apparel is disclosed. The tensioning system includes a spool system that can be engaged or disengaged from a driveshaft through the use of a cam device. The motorized tensioning device includes a torque transmitting system that allows for incremental tightening, incremental loosening and full loosening of the tensile element.

21 Claims, 15 Drawing Sheets

(56) References Cited

U.S. PATENT DOCUMENTS

2014/0068838 A1    3/2014   Beers et al.
2020/0054096 A1    2/2020   Beers et al.

FOREIGN PATENT DOCUMENTS

| CN | 203505737 | 4/2014 |
| CN | 203801869 | 9/2014 |
| CN | 203814733 | 9/2014 |
| CN | 104219977 | 12/2014 |
| CN | 104582519 | 4/2015 |
| CN | 104822284 | 8/2015 |
| CN | 110167382 | 8/2019 |
| CN | 110167382 B | 5/2022 |
| EP | 3541224 B1 | 3/2023 |
| WO | 2009071652 | 6/2009 |
| WO | 2018094156 | 5/2018 |

OTHER PUBLICATIONS

"International Application Serial No. PCT US2017 062190, Written Opinion dated Mar. 12, 2018", 10 pgs.

"International Application Serial No. PCT US2017 062190, International Preliminary Report on Patentability dated May 31, 2019", 12 pgs.

"European Application Serial No. 17871048.9, Extended European Search Report dated Nov. 7, 2019", 8 pgs.

"European Application Serial No. 17871048.9, Response filed May 31, 2020 to Extended European Search Report dated Nov. 7, 2019", I left the e-receipt at the end of the doc. response drafted May 26, but filed May 31, 74 pgs.

"Chinese Application Serial No. 201780082883.7, Office Action dated Dec. 21, 2020", w English translation, 14 pgs.

"U.S. Appl. No. 16/346,646, Non Final Office Action dated Feb. 25, 2021", 7 pgs.

"U.S. Appl. No. 16/346,646, Response filed May 25, 2021 to Non Final Office Action dated Feb. 25, 2021", 10 pgs.

"Chinese Application Serial No. 201780082883.7, Response filed Apr. 21, 2021 to Office Action dated Dec. 21, 2020", w English claims, 15 pgs.

"U.S. Appl. No. 16/346,646, Notice of Allowance dated Jun. 16, 2021", 5 pgs.

"U.S. Appl. No. 16/346,646, Corrected Notice of Allowability dated Jun. 28, 2021", 2 pgs.

"Chinese Application Serial No. 201780082883.7, Office Action dated Jul. 6, 2021", With English translation, 12 pgs.

"U.S. Appl. No. 16/346,646, Corrected Notice of Allowability dated Oct. 1, 2021", 2 pgs.

"Chinese Application Serial No. 201780082883.7, Response filed Nov. 22, 2021 to Office Action dated Jul. 6, 2021", w English claims, 19 pgs.

"Chinese Application Serial No. 201780082883.7, Response to Examiner Telephone Interview filed Jan. 24, 2022", w English claims, 11 pgs.

"Chinese Application Serial No. 202210442661.4, Voluntary Amendment filed Nov. 23, 2022", w/ English claims, 11 pgs.

COMPACT MOTORIZED TENSIONING DEVICE FOR FOOTWEAR

RELATED APPLICATIONS

This application claims the benefit of priority to U.S. Provisional Application Ser. No. 62/424,287, filed Nov. 18, 2016, the content of which is hereby incorporated by reference in its entirety.

SUMMARY

The present embodiments relate generally to articles of footwear and apparel including tensioning systems.

Articles of footwear generally include two primary elements: an upper and a sole structure. The upper is often formed from a plurality of material elements (e.g., textiles, polymer sheet layers, foam layers, leather, synthetic leather) that are stitched or adhesively bended together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. Likewise, some articles of apparel may include various kinds of closure systems for adjusting the fit of the apparel.

In one aspect, the present disclosure is directed to a motorized tensioning system comprises a spool system, the spool system including a driveshaft, a spool, a spool extension, an engagement plate, and a cam device. The driveshaft extends through the spool, and the driveshaft is coupled to the cam device. Furthermore, the spool extension is coupled to the spool. In addition, the spool system has an engaged state and a disengaged state, where the engagement plate is coupled to the spool extension in the engaged state, and the engagement plate is spaced apart from the spool extension in the disengaged state.

In another aspect, the present disclosure is directed to an article of footwear with an automated tensioning system, the article of footwear including an upper and a sole structure. The sole structure includes a motorized tensioning device and the motorized tensioning device includes a spool system. The spool system comprises a driveshaft, a spool, an engagement plate, and a cam device, and the spool system including an engaged state and a disengaged state. In addition, the driveshaft is configured to transmit torque to the cam device, the cam device is configured to transmit torque to the engagement plate, and the engagement plate is configured to transmit torque to the spool in the engaged state. Furthermore, the spool is disengaged from the driveshaft in the disengaged state.

In another aspect, the present disclosure is directed to a method of controlling a motorized tensioning device with a spool system, the method comprising turning a driveshaft in a first direction, and the driveshaft turning a cam device in the first direction. In addition, the method includes a ramped edge of the cam device pushing against a lower surface of an engagement plate such that a rotation of the cam device increases an axial distance between the cam device and the engagement plate, and increasing the axial distance between a spool that is coupled to the cam device and the engagement plate, thereby transitioning the spool system from an engaged state to a disengaged state.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
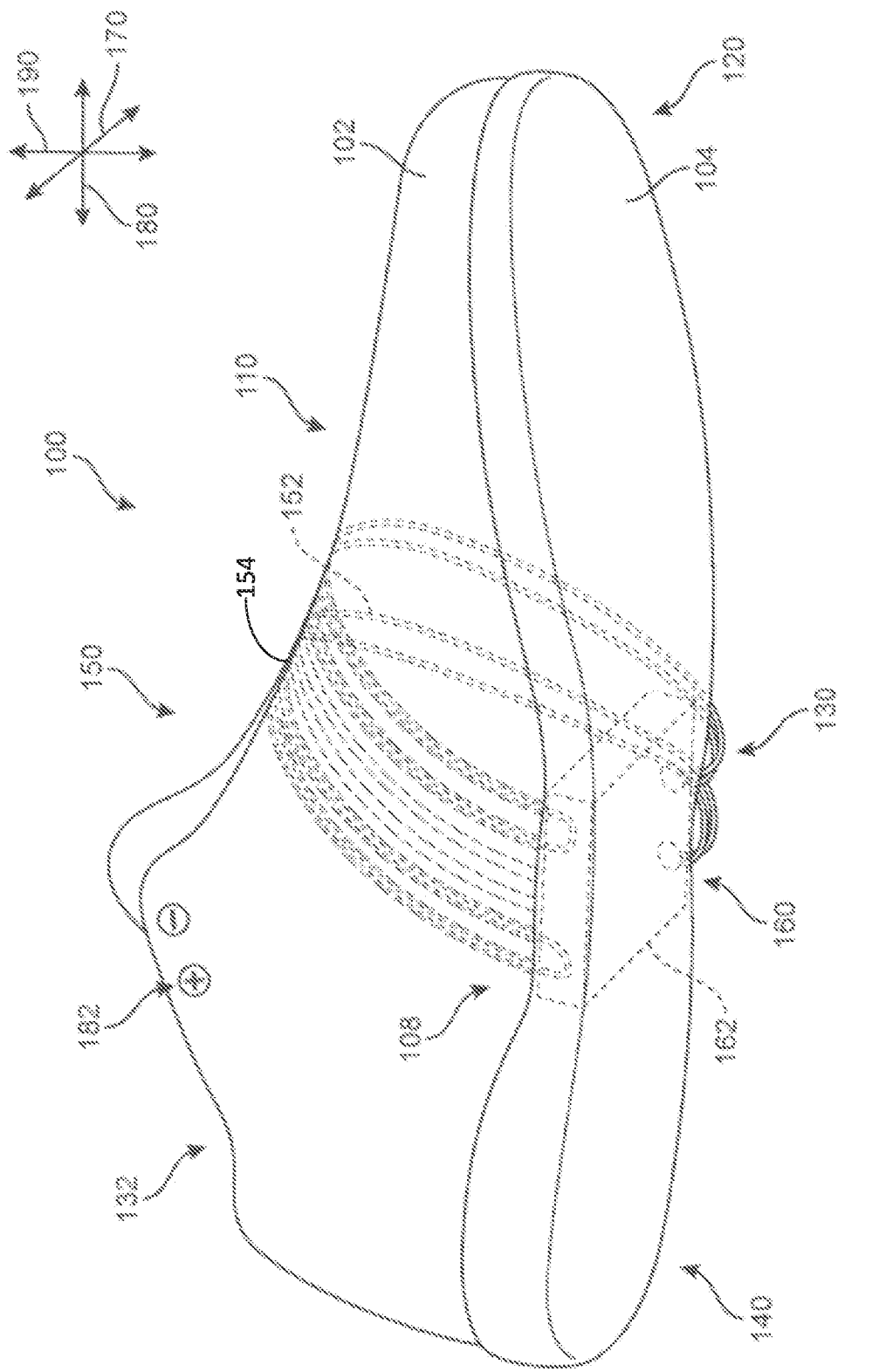
FIG. 1 is an isometric side view of an embodiment of an article of footwear with a tensioning system.

FIG. 1 illustrates a bottom perspective view of an embodiment of an article of footwear ("article") 100 that is configured with a tensioning system 150. In the current embodiment, article 100 is shown in the form of an athletic shoe. However, in other embodiments, tensioning system 150 may be used with any other kind of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments article 100 may be configured for use with various kinds of non-sports related footwear, including, but not limited to: slippers, sandals, high heeled footwear, loafers as well as any other kinds of footwear. In different embodiments, a tensioning system may not be limited to footwear and in other embodiments a tensioning system could be used with various kinds of apparel, including clothing, sportswear, sporting equipment and other kinds of apparel. In still other embodiments, a tensioning system may be used with braces, such as medical braces.

For purposes of clarity, some of the embodiments of the following detailed description discuss a tensioning system associated with article 100. However, it will be understood that other embodiments may incorporate a corresponding article of footwear (e.g., a left article of footwear when article 100 is a right article of footwear) that may share some, and possibly all, of the features of article 100 described herein and shown in the figures.

To assist and clarify the subsequent description of various embodiments, various terms are defined herein. Unless otherwise indicated, the following definitions apply throughout this specification (including the claims). For consistency and convenience, directional adjectives are employed throughout this detailed description corresponding to the illustrated embodiments.

Referring to FIG. 1, for purposes of reference, article 100 may be divided into a forefoot region 120, a midfoot region 130, and a heel region 140. Forefoot region 120 may be generally associated with the toes and joints connecting the metatarsals with the phalanges. Midfoot region 130 may be generally associated with the arch of a foot. Likewise, heel region 140 may be generally associated with the heel of a foot, including the calcaneus bone. It will be understood that forefoot region 120, midfoot region 130 and heel region 140 are only intended for purposes of description and are not intended to demarcate precise regions of article 100.

For consistency and convenience, directional adjectives are also employed throughout this detailed description corresponding to the illustrated embodiments. The term "lateral" or "lateral direction" as used throughout this detailed description and in the claims refers to a direction extending along a width of a component or element. For example, a lateral axis 170 of article may extend between a medial side 108 and a lateral side 110 of the foot. Additionally, the term "longitudinal" or "longitudinal direction" as used throughout this detailed description and in the claims refers to a direction extending across a length or breadth of an element or component (such as a sole member). In some embodiments, a longitudinal axis 180 may extend from forefoot region 120 to heel region 140 of a foot. It will be understood that each of these directional adjectives may also be applied to individual components of an article of footwear, such as an upper and/or a sole member. In addition, a vertical axis 190 refers to the axis perpendicular to a horizontal surface defined by longitudinal axis 180 and lateral axis 170. It will be understood that each of these directional adjectives may be applied to various components shown in the embodiments, including article 100, as well as components of tensioning system 150 and the embodiments of the spool system that will be presented further below.

Article 100 may include upper 102 and sole structure 104. Generally, upper 102 may be any type of upper. In particular, upper 102 may have any design, shape, size and/or color. For example, in embodiments where article 100 is a basketball shoe, upper 102 could be a high top upper that is shaped to provide high support on an ankle. In embodiments where article 100 is a running shoe, upper 102 could be a low top upper.

In some embodiments, sole structure 104 may be configured to provide traction for article 100. In addition to providing traction, sole structure 104 may attenuate ground reaction forces when compressed between the foot and the ground during walking, running or other ambulatory activities. The configuration of sole structure 104 may vary significantly in different embodiments to include a variety of conventional or non-conventional structures. In some cases, the configuration of sole structure 104 can be configured according to one or more types of ground surfaces on which sole structure 104 may be used. Examples of ground surfaces include, but are not limited to, natural turf, synthetic turf, dirt, as well as other surfaces.

In different embodiments, sole structure 104 may include different components. For example, sole structure 104 may include an outsole, a midsole, and/or an insole. In addition, in some cases, sole structure 104 can include one or more cleat members or traction elements that are configured to increase traction with a ground surface.

In some embodiments, sole structure 104 may be joined with upper 102. In some cases, upper 102 is configured to wrap around a foot and secure sole structure 104 to the foot. In some cases, upper 102 may include an opening that provides access to an interior cavity of article 100.

Some embodiments may induce provisions for facilitating the adjustment of an article to a wearer's foot. In some embodiments, these provisions may include a tensioning system. In some embodiments, tensioning system may further include ether components to include, but are not limited to, a motorized tensioning device, a housing unit, tensile elements, a motor gears, spools or reels. Such components may assist in securing and providing a custom fit to a wearer's foot. These components may help secure the article to a wearer's foot in some embodiments, as will be explained further in detail below.

In different embodiments, a tensioning system may include a tensile element. The term "tensile element" as used throughout this detailed description and in the claims refers to any component that has a generally elongated shape and high tensile strength. In some cases, a tensile element could also have a generally low elasticity. Examples of different tensile elements include, but are not limited to laces, cables, straps and cords. In some cases, tensile elements may be used to fasten and/or tighten an article, including articles of clothing and/or footwear. In other cases, tensile elements may be used to apply tension at a predetermined location for purposes of actuating some components or system.

In addition, as noted above, in different embodiments, article 100 may include a tensioning system 150. Tensioning system 150 may comprise various components and systems for adjusting the size of throat opening 132 leading to an interior void and tightening (or loosening) upper 102 around a wearer's foot. In one embodiment, tensioning system 150 comprises a fastening mechanism for the article of footwear. Some examples of different tensioning systems that can be used are disclosed in Beers et al., U.S. Patent Publication Number 2014/0070042 published Mar. 13, 2014 and entitled "Motorized Tensioning System with Sensors" and Beers et al., U.S. Pat. No. 3,056,269, issued Nov. 15, 2011 (previously U.S. Patent Publication Number 2009/0272013, published Nov. 5, 2009) and entitled "Article of Footwear with Lighting System," the entire disclosures of which are incorporated herein by reference.

A tensioning system may include provisions for providing a customizable and comfortable fit of an article to a wearer's foot. In some embodiments, the provisions may comprise of various components and systems for modifying the dimensions of the interior cavity of the article of footwear, thereby tightening (or loosening) upper 102 around a wearer's foot. In some embodiments, tensioning system 150 may comprise of a tensile element such as a lace 152 as well as a motorized tensioning device 160. In FIG. 1, the motorized tensioning device can be understood to be located within a housing unit 162. Housing unit 162 comprising motorized tensioning device 160 can be positioned adjacent to sole structure 104 in some embodiments. While motorized tensioning device 160 is disposed in midfoot region 130 in FIG. 1, it should be understood that motorized tensioning device 160 can be located in forefoot region 120, midfoot region 130, and/or heel region 140. Furthermore, in other embodiments, motorized tensioning device 160 can be disposed adjacent to or along portions of upper 102.

Provisions for mounting housing unit 162 or motorized tensioning device 160 composing the motorized tensioning device to sole structure 104 can vary in different embodiments. In some cases, a motorized tensioning device may be removably attached, so that the motor zed tensioning device can be easily removed by a user and modified (for example, when a lace must be changed). In other cases, a motorized tensioning device could be fixedly attached to sole structure 104. In one embodiment for example, an external harness (not shown) may be used to mount the motorized tensioning device to sole structure 104. In other embodiments, motorized tensioning device 160 can be joined in any manner to a surface of article 100, including mechanical attachments, adhesives, and/or molding.

In some embodiments, lace 152 may be configured to pass through various different lacing guides 154 (as shown in phantom in FIG. 1). In some cases, lacing guides 154 may provide a similar function to traditional eyelets on uppers. In particular, as lace 152 is pulled or tensioned, a throat opening 132 may generally constrict so that upper 102 is tightened around a foot. In some embodiments, lacing guides 154 may be used to arrange lace in different configurations. Furthermore, in some embodiments, lacing guides 154 may be used to facilitate the tightening or loosening of lace 152 while in various states of tension. For example, in some embodiments, lacing guides 154 may expand as lace 152 is configured in a tensioned or tightened state. With this arrangement, lace 152 is provided more room when tensioning article. Likewise, in some embodiments, lacing guides 154 could compress as lace 152 is configured from a tensioned state to a non-tensioned or loose state. In some embodiments, lace 152, positioned through lacing guides 154, may be arranged in various configurations.

The arrangement of lacing guides 154 in this embodiment is only intended to be exemplary and it will be understood that other embodiments are not limited to a particular configuration for lacing guides 154. Furthermore, the particular types of lacing guides 154 illustrated in the embodiments are also exemplary and other embodiments may incorporate any other kinds of lacing guides or similar lacing provisions in some other embodiments, for example, lace 152 could be inserted through traditional eyelets. Some examples of lace guiding provisions that may be incorporated into the embodiments are disclosed in Cotterman et al., U.S. Patent Application Publication Number 2012/0000091, published on Jan. 5, 2012, and titled "Lace Guide", which is hereby incorporated by reference in its entirety. Additional examples are disclosed in Goodman et al., U.S. Patent Application Publication Number 2011/0266384, published on Nov. 3, 2011, and titled "Reel Based Lacing System" (the "Reel Based Lacing Application"), which is hereby incorporated by reference in its entirety. Still additional examples of lace guides are disclosed in Kerns et al., U.S. Patent Application Publication Number 2011/0225843, published on Sep. 22, 2011, and titled "Guides For Lacing Systems", which is hereby incorporated by reference in its entirety. Another example of tensioning systems and lace guides is disclosed in Beers et al., PCT Application Number US2016/032249, filed May 13, 2016 and titled "Motorized Tensioning Device With Split Spool System", Beers et al., PCT Application Number US2016/032048, filed May 12, 2016 and titled "Motorized Tensioning Device With Compact Spool System," and Pheil et al., U.S. patent application Ser. No. 14/955,705, filed on Dec. 1, 2015, and titled "An Automated Tensioning System for An Article Of Footwear," the disclosures of which are hereby incorporated by reference in their entirety.

Lace 152 may comprise any type of type of lacing material known in the art. Examples of lace that may be used include cables or fibers having a low modulus of elasticity as well as a high tensile strength. A lace may comprise a single strand of material, or can comprise multiple strands of material. An exemplary material for the lace is SPECTRA™, manufactured by Honeywell of Morris Township NJ, although other kinds of extended chain, high modulus polyethylene fiber materials can also be used as a lace. Still further exemplary properties of a lace can be found in the Reel Based Lacing Application mentioned above.

In some embodiments, a motorized tensioning device may generally be configured to automatically apply tension to a lace for purposes of tightening and loosening upper 102. A motorized tensioning device may thus include provisions for winding a lace onto, and unwinding a lace from, a spool internal to the motorized tensioning device. Moreover, the provisions may include an electric motor that automatically winds and unwinds the spool in response to various inputs or controls, as also disclosed in the An Automated Tensioning System for An Article Of Footwear application, the Motorized Tensioning Device With Split Spool System, and the Motorized Tensioning Device With Compact Spool System application. In one embodiment, tensioning system 150 is an automatic tensioning system that can provide automated fastening to the article. For purposes of this disclosure, an automated feature or activity is one that can occur without a continuous command or repeated interaction by a user throughout the duration of the automated activity. For example, the articles incorporating the tensioning system described herein may be able to auto-lace or auto-loosen without sustained or repeated manual adjustment or manual control by the user. In other embodiments, tensioning system 150 may not be automated and can be adjusted by manual controls such as buttons or dials, and/or direct interaction with lace 152, as also disclosed in the An Automated Tensioning System for An Article Of Footwear application, the Motorized Tensioning Device With Split Spool System, and the Motorized Tensioning Device With Compact Spool System application.

Thus, in some embodiments, article 100 may include a plurality of control buttons 182 that are capable of initiating control commands. In some embodiments, control buttons 182 may allow a user to tighten one or both shoes simultaneously. Optionally, some embodiments could include a "fully tighten" command that would tighten the footwear until a predetermined threshold is achieved (for example, a threshold pressure, winding distance, etc.). Article 100 may also include provisions for storing and using preferred tension settings. In some embodiments, control buttons 182 may be disposed along any portion of upper 102.

In different embodiments, a motorized tensioning device may be configured to automatically apply tension to lace 152 or allow a loosening or unwinding of lace 152. In some embodiments, motorized tensioning device 160 may include provisions for winding lace 152 onto, and unwinding lace 152 from, reel elements 210 internal to motorized tensioning device 160. Moreover, the provisions may include a motor assembly 250 that actuates components for facilitating the winding and unwinding of lace 152 onto reel elements 210 in response to various inputs or controls.

Figure 2:
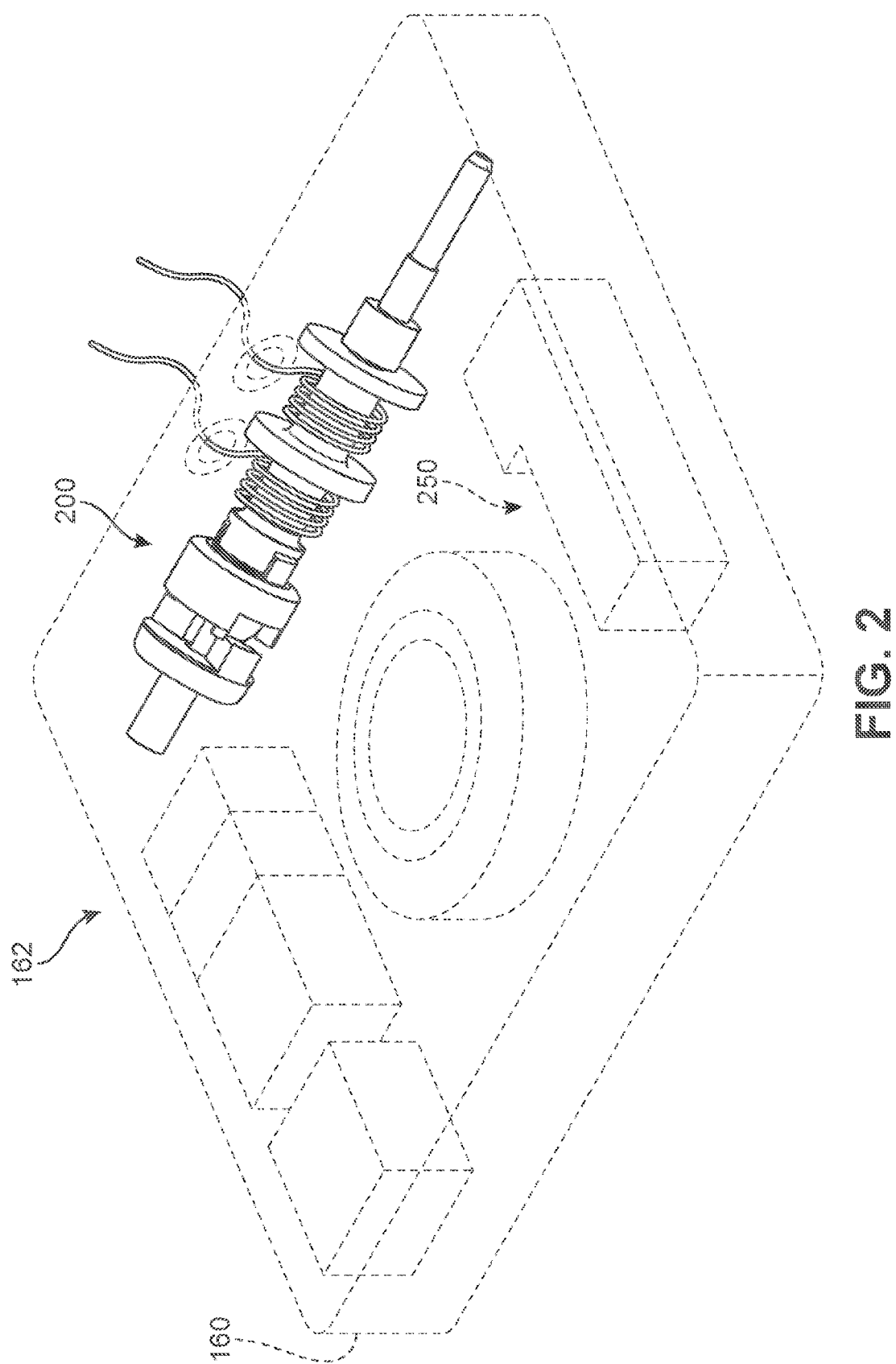
FIG. 2 is a schematic isometric view of an embodiment of a tensioning device.

Referring now to FIG. 2, an isolated view of motorized tensioning device 160 is depicted, where housing unit 162 is represented with dotted lines. In FIG. 2, some generalized components of motorized tightening device 160 are shown within a portion of housing unit 162 in dotted lines. It should be understood that these components are shown for illustrative purposes only and the spool system can be utilized with any other components of a motorized system. In some embodiments, housing unit 162 may be shaped so as to optimize the arrangement of components of motorized tensioning device 160.

In different embodiments, a motor can perform by rotating an object or component associated with the motor. Thus, in one embodiment, a motor is a device that can convert electricity or electrical energy into motion or mechanical torque. In some embodiments, a turning movement of a wheel in the motor occurs during operation of the motor. In one embodiment, there may be a component such as a rotor and/or a shaft which are configured to rotate in the motor. In some cases, when a current is applied to the motor, the current can be converted to mechanical energy or a rotational movement of a component in the motor.

For purposes of this disclosure, references made to a motor moving in a particular direction (for example, in a forward direction or in a reverse direction) refer to the direction of turning or rotation of the rotating component associated with the motor. For example, in one embodiment, the forward direction may refer to the clockwise rotational direction of a rotor in the motor. In another embodiment, the forward direction can refer to the counter-clockwise rotational direction of a rotor in the motor. Thus, it should be understood that the directional terms are not intended to define precise operations of the motor. Rather, references to a direction are intended to represent general rotational movement of a component of the motor. Furthermore, the forward direction and the reverse direction should be understood to represent opposing rotational directions.

In some embodiments, motor assembly 250 could include an electric motor. However, in other embodiments, motor assembly 250 could comprise any kind of non-electric motor known in the art. Examples of different motors that can be used include, but are not limited to: DC motors (such as permanent-magnet motors, brushed DC motors, brushless DC motors, switched reluctance motors, etc.), AC motors (such as motors with sliding rotors, synchronous electrical motors, asynchronous electrical motors, induction motors, etc.), universal motors, stepper motors, piezoelectric motors, as well as any other kinds of motors known in the art. Motor assembly 250 may further include a motor crankshaft that can be used to drive one or more components of motorized tensioning device 160. Some examples of provisions for powering motor assembly 250, including various kinds of batteries, are disclosed in the Motorized Tensioning Device With Split Spool System application and the Motorized Tensioning Device With Compact Spool System application referenced above.

In some embodiments, motorized tensioning device 160 can include provisions for reducing the output speed of, and increasing the torque generated by, motor assembly 250. In some embodiments, motorized tensioning device 160 can include one or more gear reduction assemblies and/or gear reduction systems. Some examples of gear reduction assemblies that may be utilized in the embodiments are disclosed in the Motorized Tensioning Device With Split Spool System application referenced above.

Figure 3:
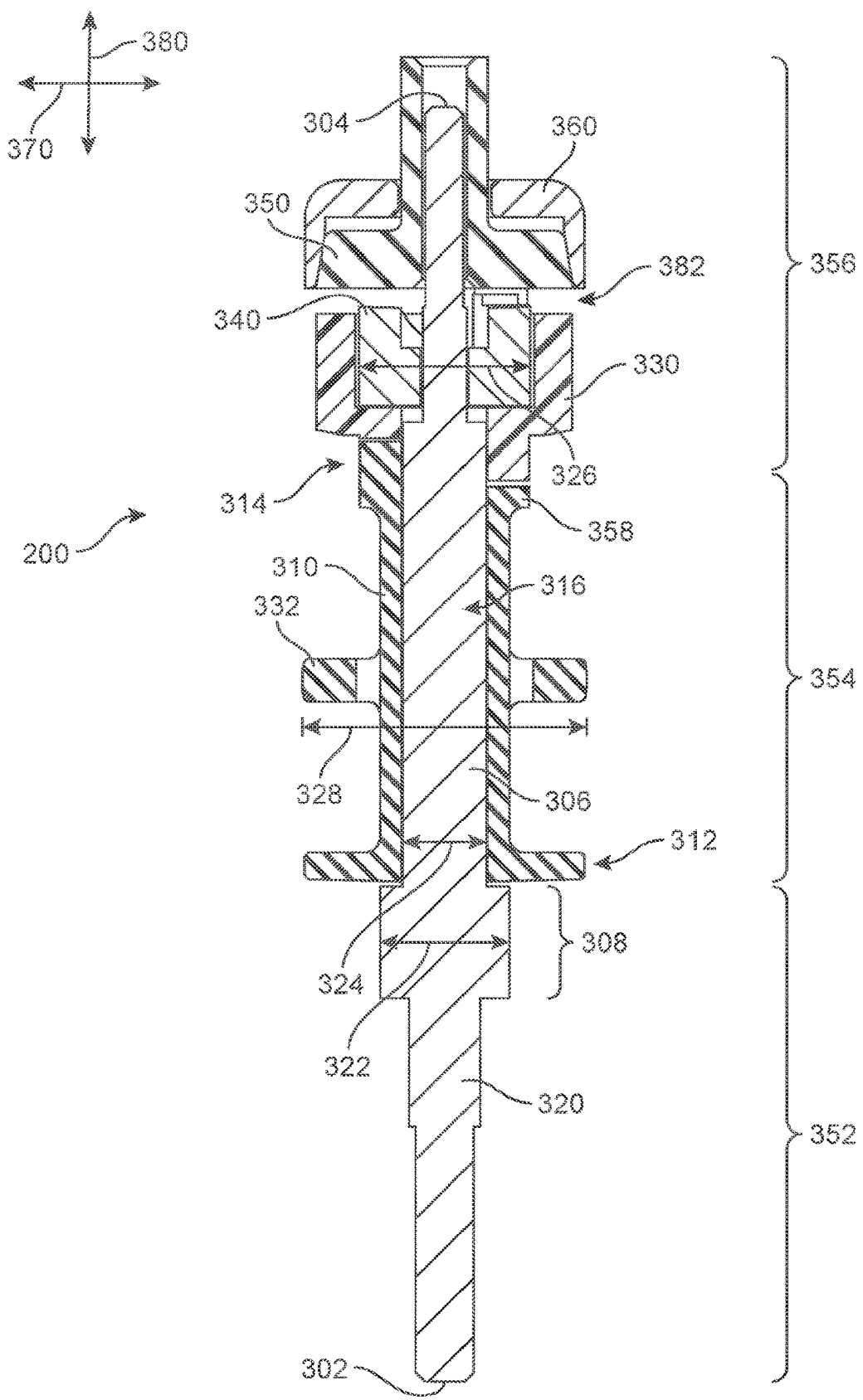
FIG. 3 is a schematic cross-sectional view of an embodiment of a spool system.

As noted previously, in some embodiments, motorized tensioning device 160 can include provisions for winding and unwinding portions of a lace. In some embodiments, motorized tensioning device 160 can include a spool system 200. In some cases, spool system 200 may include various components. Referring to FIG. 3, for purposes of illustration, spool system 200 is depicted in isolation and in cross-section in an 'engaged' state, where the use of the phrase engaged state will be clarified further below. In FIG. 3, it can be seen that spool system 200 comprises a spool comprising a spool winding component 310 and a spool extension component ("spool extension") 330, a driveshaft 320, a cam device ("cam") 340, and an engagement plate 350. In one embodiment, engagement plate 350 can be further associated with or covered by a friction plate 360, as will be discussed further below. It should be understood that while spool winding component 310 and spool extension 330 are described as two independent components of the spool in the Figures, in other embodiments, the spool may be a single component—or two portions integrally connected—that provides the same function and/or overall structure as spool winding component 310 and spool extension 330. Furthermore, in different embodiments, it can be understood that spool winding component 310 may be configured to receive at least a first tensile element where the first tensile element can be wound around the spool when the article of footwear is being tensioned, and the first tensile element is unwound from the spool when the article of footwear is being loosened.

In some embodiments, driveshaft 320 can be understood to extend from a first shaft end 302 to a second shaft end 304 in a direction substantially aligned with a longitudinal axis 380. In one embodiment, driveshaft 320 and/or spool winding component 310 can be substantially elongated. In some embodiments, driveshaft 320 and/or spool winding component 310 may have an approximately cylindrical geometry, or may be comprised of distinct sections or portions each having an approximately cylindrical geometry. In one embodiment, various portions of driveshaft 320 and/or spool winding component 310 can have an approximately square or rectangular cross-sectional shape. In addition, spool winding component 310 can be disposed such that it substantially surrounds or is disposed around a middle portion 306 of driveshaft 320 in some embodiments. In other words, in some embodiments, spool winding component 310 can include an opening such as a tunnel or channel 316 through which a portion of driveshaft 320 can extend.

In different embodiments, driveshaft 320 can include provisions to help axially secure spool winding component 310 along middle portion 306. Middle portion 306 can extend or be disposed between first shaft end 302 and second shaft end 304. In one embodiment, driveshaft 320 includes a collar portion 308. In some embodiments, collar portion 308 is disposed adjacent to a first spool end 312 of spool winding component 310. In one embodiment, collar portion 308 can have a diameter or width greater than the diameter of channel 316. For example, in FIG. 3, collar portion 308 has a first diameter 322, and channel 316 has a second diameter 324 that is less than first diameter 322. However, in other embodiments, driveshaft 320 may not include a collar portion 308, but use some other device to axially secure spool winding component 310, like a snap ring.

For purposes of reference, spool system 200 can be understood to include three portions: a shaft portion 352, a spool portion 354, and an adjustable portion 356. Shaft portion 352 corresponds generally to the portion of spool system 200 extending from first shaft end 302 to collar portion 308. In certain examples, shaft portion 352 comprises only a portion of driveshaft 320, unassociated with other spool system components. Spool portion 354 corresponds generally to the portion of spool system 200 that includes spool winding component 310, extending from a first spool end 312 to a second spool end 314. Adjustable portion 356 can be understood to include engagement plate 350, cam 340, and spool extension 330. In embodiments that include friction plate 360, adjustable portion 356 can also include friction plate 360.

In different embodiments, spool winding component 310 can include provisions for securing and/or positioning a lace around spool winding component 310. For example, in some embodiments, spool winding component 310 can include one or more 'fins', handles, or raised portions 332. Raised portions 332 can help to collect, gather, or otherwise help to position a lace such that it remains associated with a surface of spool winding component 310 and/or prevent a lace from shifting position toward or onto other components of spool system 200. In addition, in some embodiments, spool winding component 310 can include provisions for securing or engaging with spool extension 330. In one embodiment, spool winding component 310 includes a lip portion 358 that is associated with second spool end 314. Lip portion 358 can have a diameter that is larger than adjacent portions of spool winding component 310. Lip portion 358 can also help to secure or collect a tensile element around spool winding component 310 in some embodiments in a manner similar to raised portions 332. In different embodiments, lip portion 358 and/or raised portions 332 may extend continuously around the circumference of spool winding component 310, while in other embodiments, lip portion 358 and/or raised portions 332 can include gaps, openings, or recesses.

In FIG. 3 it can also be seen that in some embodiments, spool system 200 can be assembled or arranged such that the longitudinal length of spool system 200 is substantially greater than a lateral width (relative to a lateral axis 370). In other words, in some embodiments, spool system 200 can be arranged as a radially compact system, where its radius is short relative to its longitudinal length. This arrangement can allow spool system 200 to be positioned in the motorized tensioning device 160 with minimal space requirements, and relatively minor compartmentalization (see FIG. 2). In FIG. 3, it can be seen that in some embodiments, the widest portions of spool system 200 are associated with each of raised portion 332. In various examples, the maximum diameter or width associated with driveshaft 320 is less than the widths associated with raised portions 332 of spool winding component 310. In addition, each of the diameters or widths of spool extension 330, engagement plate 350, and friction plate 360 are also less than the widths associated with raised portions 332 of spool winding component 310. As one example, in FIG. 3, spool extension 330 has a third diameter 326 that is less than a fourth diameter 328 associated with a portion of spool winding component 310 including two generally aligned raised portions 332.

Furthermore, in some embodiments, while a portion of driveshaft 320 extends through the opening formed in spool winding component 310, there can be a first portion of driveshaft 320 that extends axially outward from second spool end 314 of spool winding component 310 and is substantially surrounded by cam 340. In one embodiment, cam 340 is approximately cylindrical and also includes a through-hole channel or opening through which the first portion of driveshaft 320 extends. Similarly, there can be a second portion of driveshaft 320 that extends axially outward from the first portion of driveshaft 320, wherein the second portion is substantially surrounded by engagement plate 350. In one embodiment, engagement plate 350 is approximately cylindrical and also includes a channel or opening through which the second portion of driveshaft 320 extends. In some embodiments, the channel through engagement plate 350 can be a through-hole opening, and in other embodiments, as shown in FIG. 3, the channel through engagement plate 350 can be a blind-hole opening. This arrangement and relative radially compact sizing of each component can allow spool system 200 to be disposed in or fitted into a relatively small housing, which may be particularly useful in applications where the motorized tensioning device is configured for use in an article of footwear.

In the sequence provided by FIGS. 3-8, spool system 200 is shown from different angles, transitioning between an engaged state and a disengaged state. For purposes of this description, the engaged state of spool system 200 occurs when spool extension 330 is keyed with or coupled to engagement plate 350, and the disengaged state of spool system 200 occurs when spool extension 330 is no longer keyed with or coupled to engagement plate 350. In one embodiment, spool winding component 310 can rotate freely ("freewheel") in the disengaged state in at least one direction. In one embodiment, freewheeling occurs when the spool can rotate independently of the driveshaft. Thus, if a tensile element has been wound around spool winding component 310, the tensile element can be freely unwound from the spool system in the disengaged state.

Figure 4:
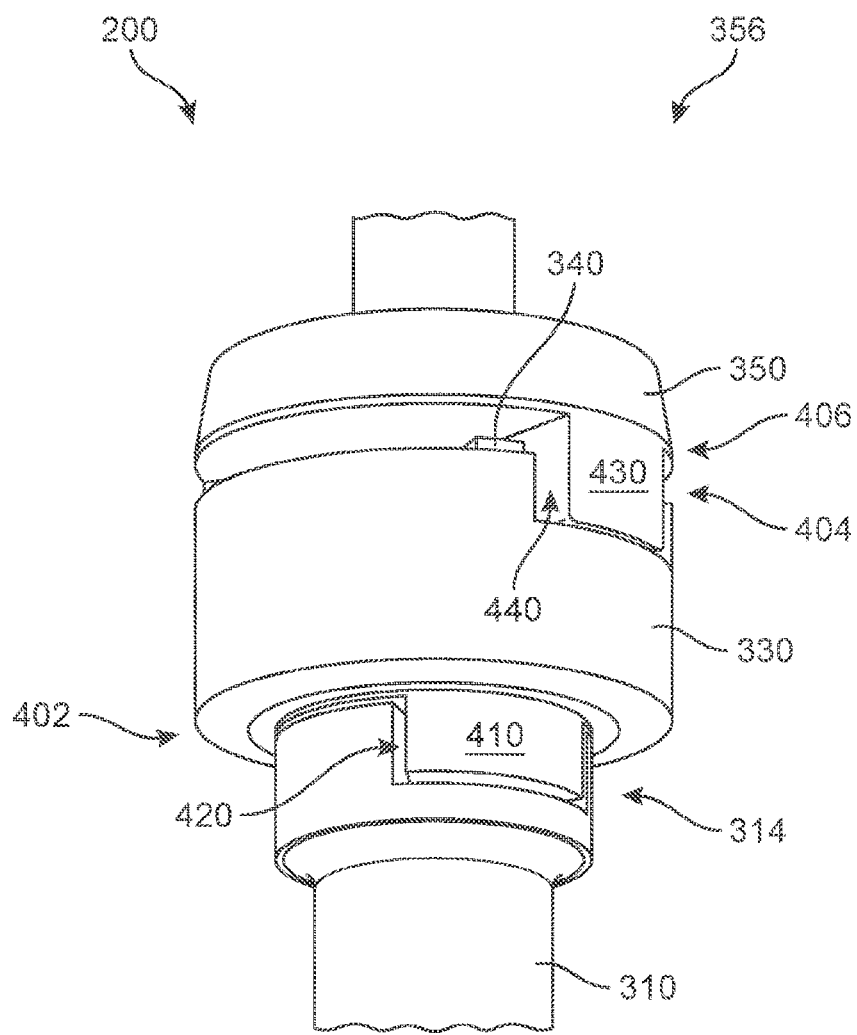
FIG. 4 is an isometric view of an embodiment of a portion of a spool system in an engaged state.

Referring now to FIG. 4, an isometric view of a portion of spool system 200 is depicted, providing a larger view of adjustable portion 356, inducing a portion of engagement plate 350, cam 340, spool extension 330, and a portion of spool winding component 310. The depiction in FIG. 4 represents spool system 200 in a fully engaged state. It can be seen that in some embodiments, different components can engage with or connect with one another. In one embodiment, spool extension 330 can be engaged with spool winding component 310 through a kind of lock-tab system. For example, in FIG. 4, spool winding component 310 includes a first recess 420 associated with second spool end 314. First recess 420 can be sized and dimensioned to receive a first mating tab portion ("first tab") 410 extending outward from a first extension end 402 of spool extension 330. Furthermore, in some embodiments, spool extension 330 can include a second recess 440 associated with a second extension end 404. Second recess 440 can be sized and dimensioned to receive a second mating tab portion ("second tab") 430 extending outward from a first engagement end 406 of engagement plate 350. Thus, in some embodiments, when first tab 410 is positioned within first recess 420, it can be understood that spool winding component 310 and spool extension 330 are "keyed" with one another, and a rotation of one component will correspond with rotation of the keyed component. Similarly, in some embodiments, when second tab 430 is positioned within second recess 440, it can be understood that spool extension 330 and engagement plate 350 are "keyed", coupled, or meshed with one another, and a rotation of one component will correspond with rotation of the keyed component. In one embodiment, if the first keyed component is in a fixed or locked state (e.g., is not able to rotate), the second keyed component will also be in a fixed or locked state. In addition, when the first keyed component is rotating, the second keyed component will also be rotating.

Figure 5:
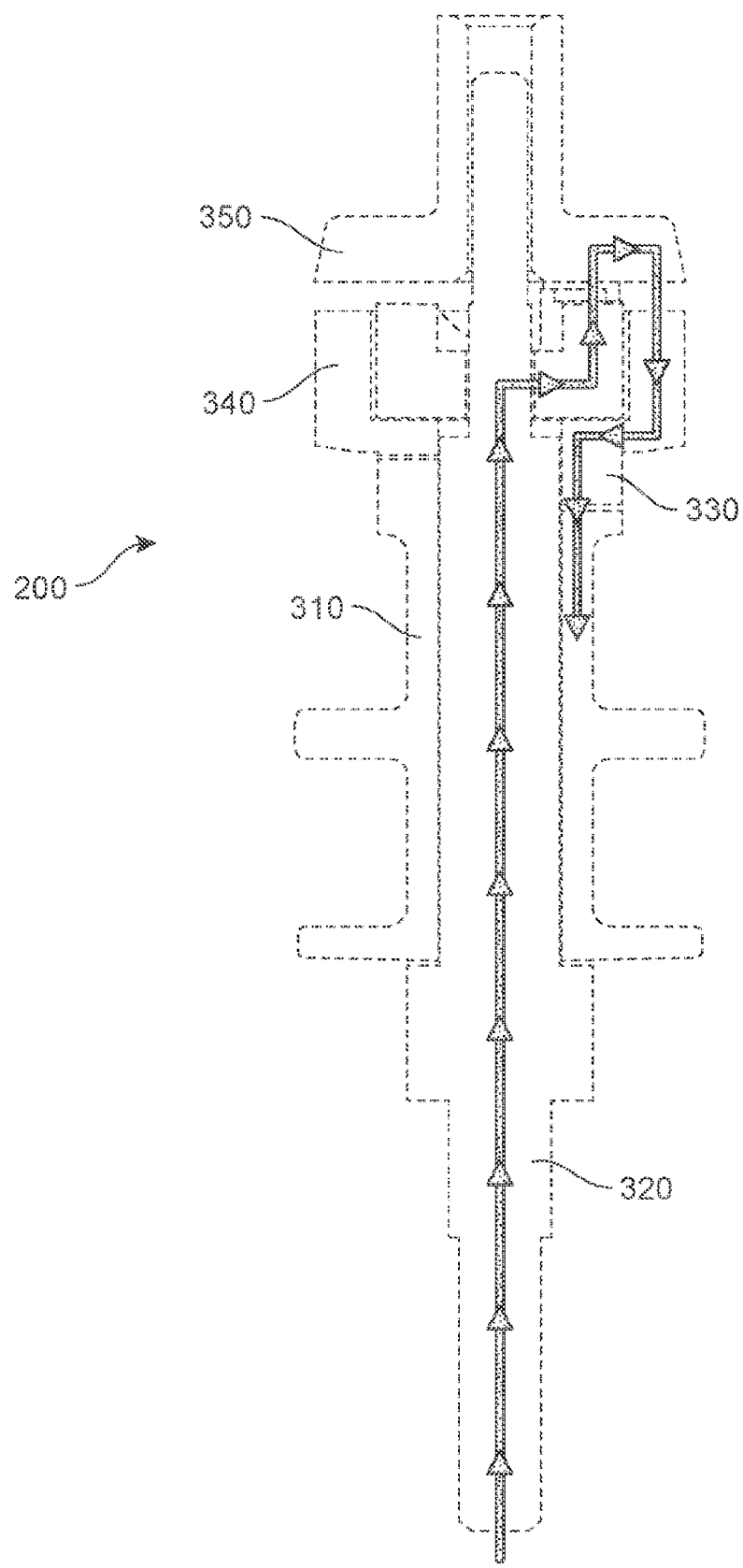
FIG. 5 is a schematic view of a power flow diagram, according to an embodiment.

In order to better understand the embodiments, FIG. 5 presents a schematic view of a power flow diagram depicting spool system 200 in a tensioned or engaged state. As indicated by the flow arrow, in one embodiment, when a motor turns or transmits torque to driveshaft 320, driveshaft 320 engages or transmits torque to cam 340. In turn, cam 340 engages or transmits torque to engagement plate 350. Because engagement plate 350 is positioned in mesh with spool extension 330, the rotation of engagement plate 350 engages or transmits torque to spool extension 330. Power flow then moves from spool extension 330 to spool winding component 310, such that torque is transmitted to spool winding component 310. Any tensile element associated with spool winding component 310 can be wound and tightened as a result.

Figure 6:
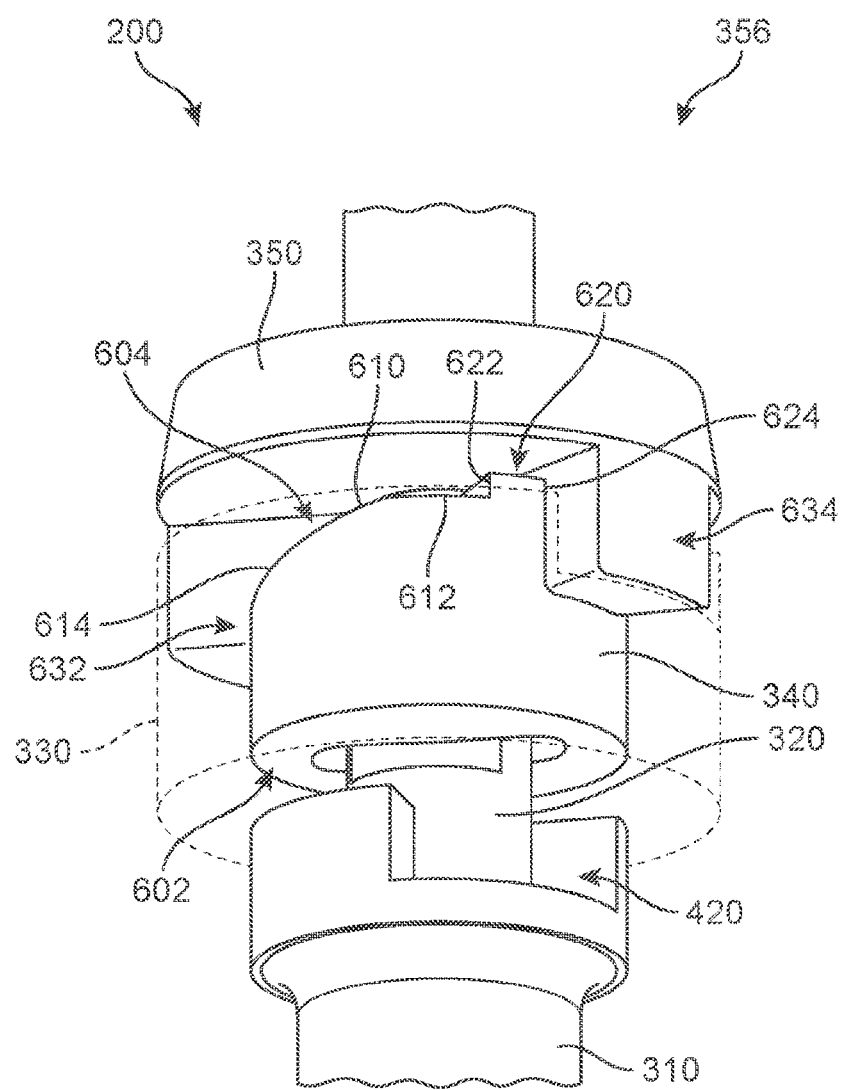
FIG. 6 is an isometric view of an embodiment of a portion of a spool system in an engaged state.

Referring now to FIG. 6, the portion of spool system 200 comprising adjustable portion 356 of FIG. 4 is shown with spool extension 330 is depicted in dotted lines, permitting the reader a clearer view of cam 340. The geometry of cam 340 can vary in different embodiments. In some embodiments, cam 340 can be substantially or partially cylindrical, or may have an approximately cylindrical geometry, or may be comprised of distinct sections or portions each having an approximately cylindrical geometry. For purposes of reference, cam 340 can be understood to include a first cam end 602 and a second cam end 604. In some embodiments, first cam end 602 comprises an outer surface that is substantially planar or flat on one side or surface. In some embodiments, cam 340 can have an outer surface with a constant curvature.

Figure 7:
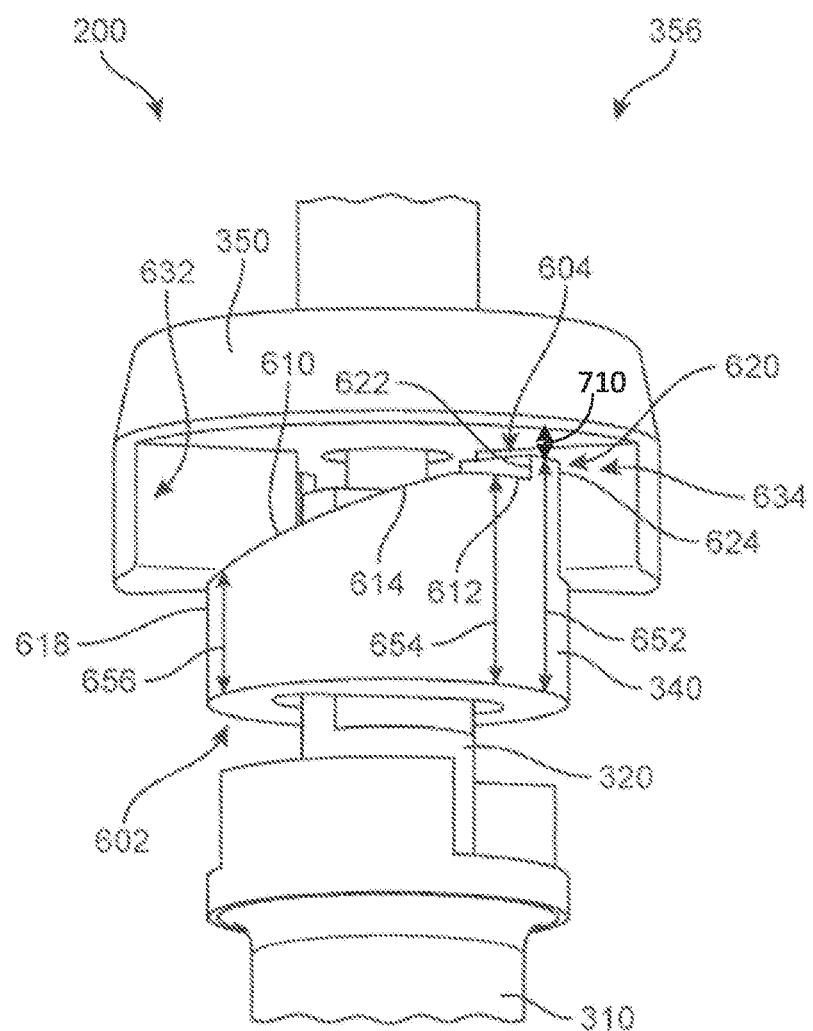
FIG. 7 is an isometric view of an embodiment of a portion of a spool system.

FIG. 6 presents adjustable portion 356 of FIG. 6 from a rotated angle to provide the reader with a greater understanding of the embodiments. As shown in FIGS. 6 and 7, second cam end 304 can include provisions for engaging with engagement plate 350 in some embodiments. For example, in FIGS. 6-7, second cam end 304 is associated with a ramped edge 610 joined to a step portion 620. Step portion 620 can comprise a substantially sharp change in height relative to the rest of cam 340 in some embodiments, such that it extends upward relative to ramped edge 610. In one embodiment, step portion 620 comprises a substantially rectangular three-dimensional shape. In other embodiments, step portion 620 can include curvature, or have any other regular or irregular shape. The geometry of step portion 620 can facilitate the interaction between cam 340 and engagement plate 350 in some embodiments, as will be described below.

Furthermore, ramped edge 610 can extend from a first step end 622 of step portion 620 and—following a counterclockwise direction relative to the perspective of FIG. 6—extend downward with a gradually decreasing height. In other words, the length of the cylindrical shape comprising cam 340 can decrease through different portions of cam 340. As shown in FIGS. 6-7, in one embodiment, ramped edge 310 can have a first linear portion 612 that is directly adjacent to first step end 622. Furthermore, first linear portion 612 can then be joined to a sloped portion 614 that extends around a portion of the circumference of cam 340. In some embodiments, sloped portion 614 decreases in height either continuously or in stages relative to first linear portion 612 until it abuts a second step end 624 (see FIG. 8) of step portion 620. In other words first step end 622 corresponds to the opposite facing side of second step end 624. As noted below, it can be seen that second step end 624 has a greater height relative to first step end 622.

Figure 8:
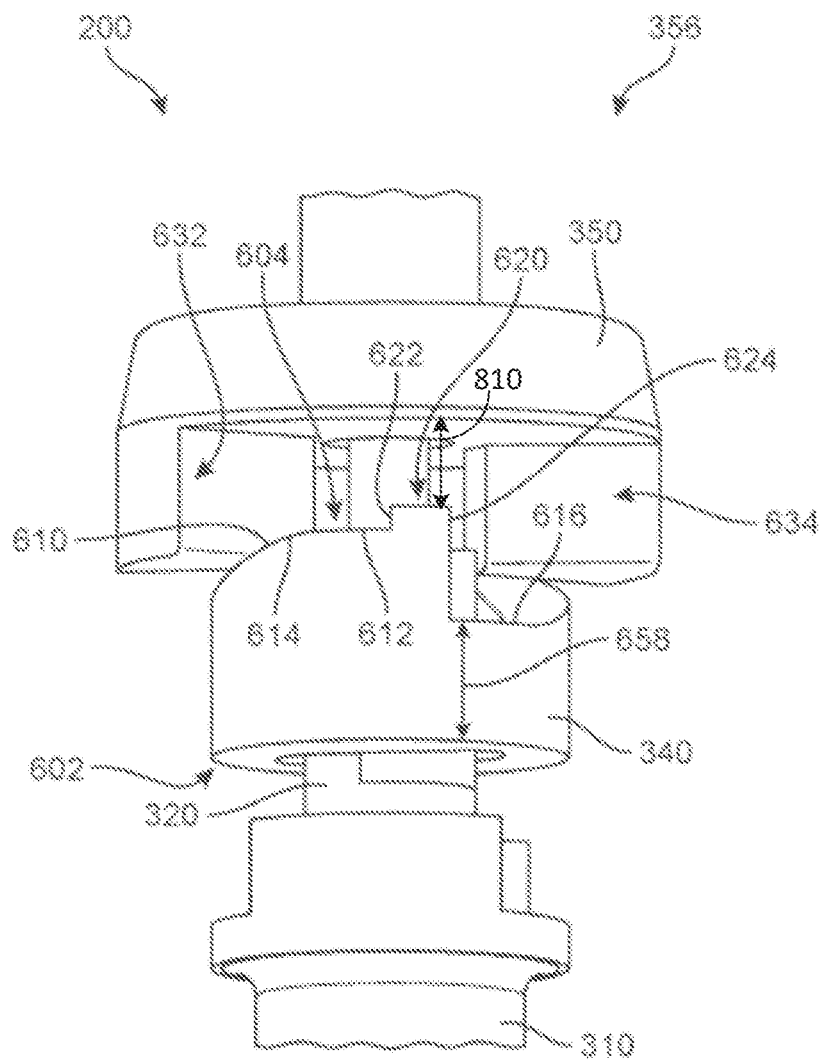
FIG. 8 is an isometric view of an embodiment of a portion of a spool system.

Thus, in different embodiments, cam 340 can have varying dimensions. In FIG. 7, cam has a first height 652 associated with the distance between first cam end 602 and step portion 620, a second height 654 associated with the distance between first cam end 602 and first linear portion 612, and a third height 656 associated with the distance between first cam end 602 and an intermediate portion 618 of sloped portion 614. Furthermore, as spool system 200 begins to disengage, cam 340 can rotate relative to engagement plate, as shown in FIG. 8. In some embodiments, as shown in FIG. 8, cam 340 can have a fourth height 658 associated with the distance between first cam end 602 and a second linear portion 616 of ramped edge 610. In different embodiments, first height 652 is greater than second height 654. In some embodiments, second height 654 can be greater than third height 656. In addition, in some embodiments, third height 656 can be greater than fourth height 658. In addition, it can be understood that in one embodiment, step portion 620 is a substantially dissimilar height relative to the remainder of second cam end 604. In other words, while ramped edge 610 may decrease in height gradually in some embodiments, the change in height from step portion 620 to first linear portion 612 can occur more abruptly and provide a raised bump or bulged area of second cam end 604.

Furthermore, in some embodiments, engagement plate 350 can include provisions for engaging with and/or disengaging from cam 340, as rotational motion of driveshaft 320 occurs. In some embodiments, a lower portion of engagement plate 350 has a substantially or partially cylindrical shape. In one embodiment, there may be one or more spoke portions disposed along the periphery of first engagement end 406. In FIGS. 6-8, a first spoke portion 632 extends downward from engagement plate 350 and a second spoke portion 634 extends downward from engagement plate 360. In one embodiment, second spoke portion 634 can correspond to second tab 430 as described with respect to FIG. 4. In some embodiments, spoke portions may be space apart from one another. In other embodiments, portions of spoke portions can be joined or abut one another. Furthermore, spoke portions can have varying cross-sectional shapes in different embodiments, including rectangular, square, elliptical, or other regular or irregular shapes. In FIGS. 6-8, it can be seen that spoke portions have a substantially rectangular three-dimensional shape. This shape can facilitate the interaction between engagement plate 350 and cam 340.

Thus, in different embodiments, in the engaged state shown in FIGS. 3-6, it can be understood that the turning of driveshaft 320—being keyed to cam 340—will also cause cam 340 to turn. Furthermore, as best seen in FIG. 7, because a flat inner surface of step portion 620 of cam 340 is positioned flush against an inner sidewall of engagement plate 350 in the engaged state, when the driveshaft 320 rotates clockwise, second step end 624 of step portion 620 can be disposed flush against and/or push against an inner sidewall of second spoke portion 634, which can cause a rotation of engagement plate 350. The rotation of engagement plate 350—being keyed to spool extension 330—then causes rotation of spool extension 330. The rotation of spool extension 330—being keyed to spool winding component 310—causes rotation of spool winding component 310, winding spool winding component 310 and allowing a tensioning or tightening of any tensile elements associated with spool winding component 310. This was also depicted in the power flow diagram of FIG. 5. This system may allow for positive engagement of the spool winding component 310 during tightening operations, such that friction is not required to tighten the article of footwear. Furthermore, in one embodiment, this type of system may allow a user to make small adjustments (either tighten or loosen) while the system is still under tension.

Referring to the transition as shown from FIGS. 6-9, when cam 340 rotates in a direction that is opposite to the direction for winding or tightening—for example, during unwinding or loosening operations of the motorized tensioning device—ramped edge 610 can be configured to raise engagement plate 350, or otherwise increase the distance between cam 340 and engagement plate 350. In one embodiment, cam 340 is keyed to driveshaft 320, and as driveshaft 320 rotates, cam 340 will rotate in the same direction. Ramped edge 610 of cam 340 then pushes against a lower surface of first spoke portion 632 of engagement plate 350, such that the space between cam 340 and engagement plate 350 increases. In some embodiments, cam 340 can raise engagement plate 350 until engagement plate 350 is no longer engaged with or is spaced apart from (e.g., has no contact with) spool extension 330. In one embodiment, the rotation of cam 340 and translational movement of engagement plate 350 (i.e., in a direction away from cam 340) can continue until first step end 622 of step portion 620 is positioned substantially flush against an inner sidewall of first spoke portion 632 (see FIG. 9). In one embodiment, first spoke portion 632 can be understood to provide a kind of 'brake' that receives step portion 620, helping to prevent the components from further translational movement once the spool has been disengaged.

Figure 9:
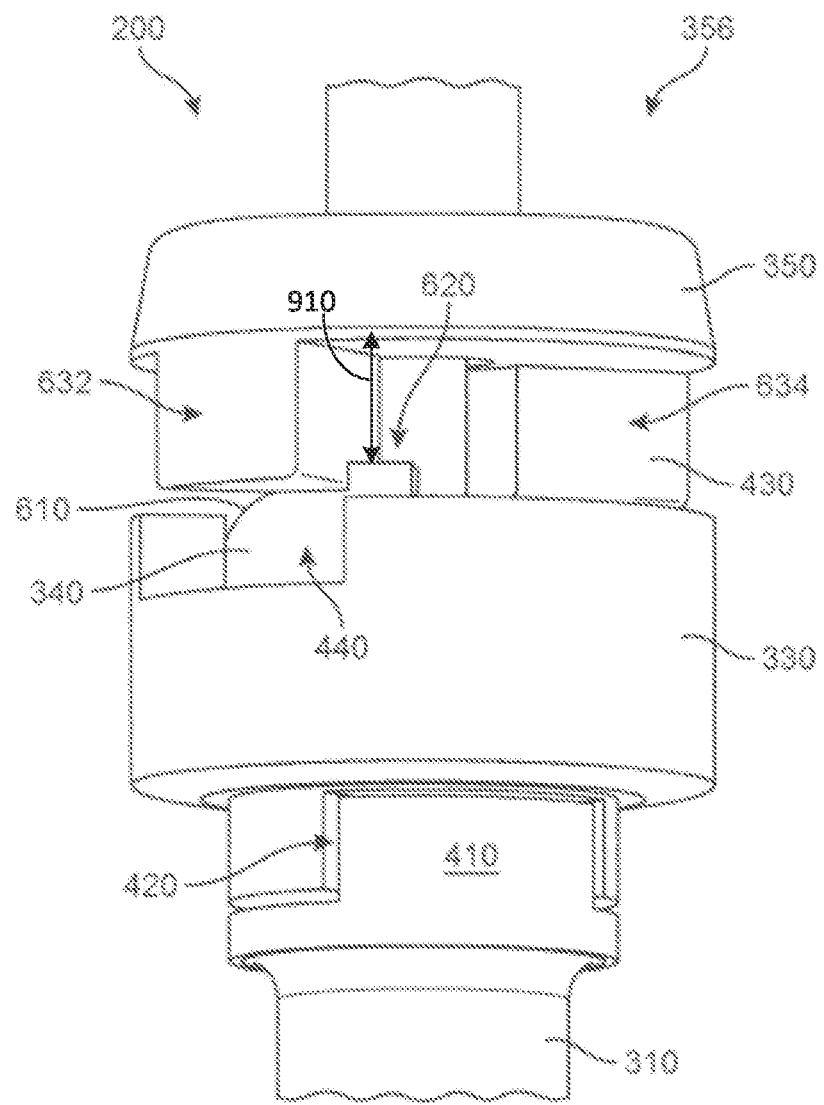
FIG. 9 is an isometric view of an embodiment of a portion of a spool system in a disengaged state.

As shown in FIG. 8, during the disengagement process, the distance between cam 340 and engagement plate 350 can increase. For example, in FIG. 7, step portion 620 of cam 340 and engagement plate 350 are separated by a first distance 710, and in FIG. 8, step portion 620 of cam 340 and engagement plate 350 are separated by a second distance 810, where second distance 810 is greater than first distance 710. In FIG. 9, step portion 620 of cam 340 and engagement plate 350 are separated by a third distance 910, where third distance 910 is greater than second distance 810. In addition, first linear portion 612 can be positioned directly beneath and/or flush against a lower surface of first spoke portion 632 when step portion 620 is disposed against the inner sidewall of first spoke portion 632, providing greater security and support within the system in the disengaged state.

Referring to FIG. 9, an isometric view of a portion of spool system 200 is depicted, including a portion of engagement plate 350, cam 340, spool extension 330, and a portion of spool winding component 310. The depiction in FIG. 9 represents spool system 200 in a fully disengaged state. It can be seen that in some embodiments, different components can be disposed in different positions relative to the engaged state that was depicted in FIG. 4. In one embodiment, spool extension 330 can remain engaged with spool winding component 310 through the lock-tab system described earlier with respect to FIG. 4. However, in some embodiments, spool extension 330 can now be disconnected or disengaged from engagement plate 350. In other words, second recess 440 is no longer associated with second tab 430 of engagement plate 350. Thus, in some embodiments, it can be understood that spool extension 330 and engagement plate 350 are no longer "keyed" or meshed with respect to one another.

Figure 10:
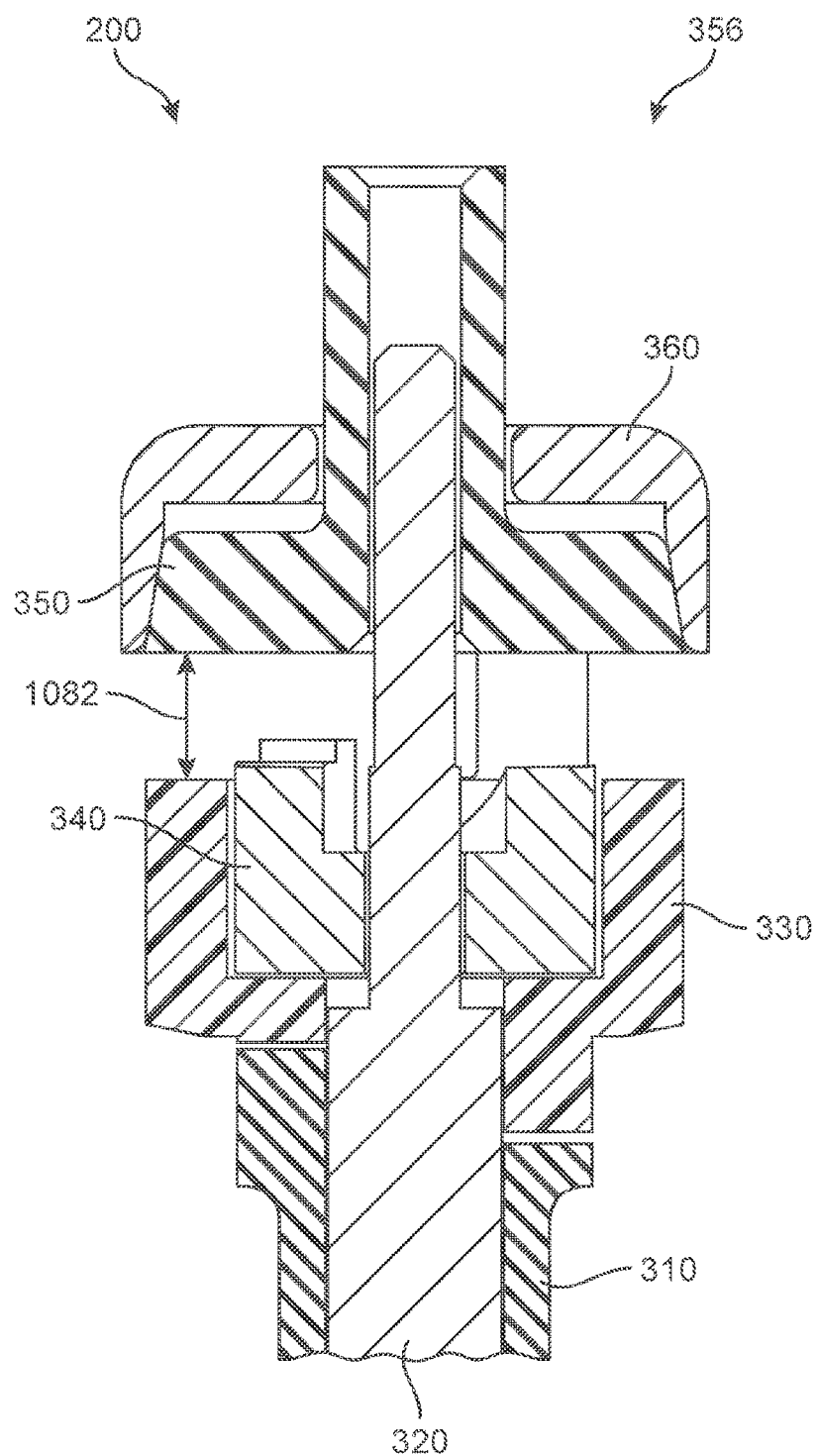
FIG. 10 is a schematic cross-sectional view of an embodiment of a portion of a spool system.

Referring now to FIG. 10, for purposes of illustration, spool system 200 is depicted in isolation and in cross-section in the disengaged state, in contrast to FIG. 3. It can be seen that the spacing between engagement plate 350 and both cam 340 and spool extension 330 is greater in FIG. 10 relative to FIG. 3. For example, while there is a first gap 382 between engagement plate 350 and spool extension 330 in FIG. 3, there is a second gap 1082 between engagement plate 350 and spool extension 330 in FIG. 10 that is larger than first gap 382.

As noted above, in some embodiments, spool system 200 can also include friction plate 360. Friction plate 360 can be disposed adjacent to, around, or substantially surrounding engagement plate 350. In some embodiments, friction plate 360 can help ensure that engagement plate 350 does not spin or rotate with cam 340 during a loosening operation, but instead moves axially, as described previously.

Figure 11:
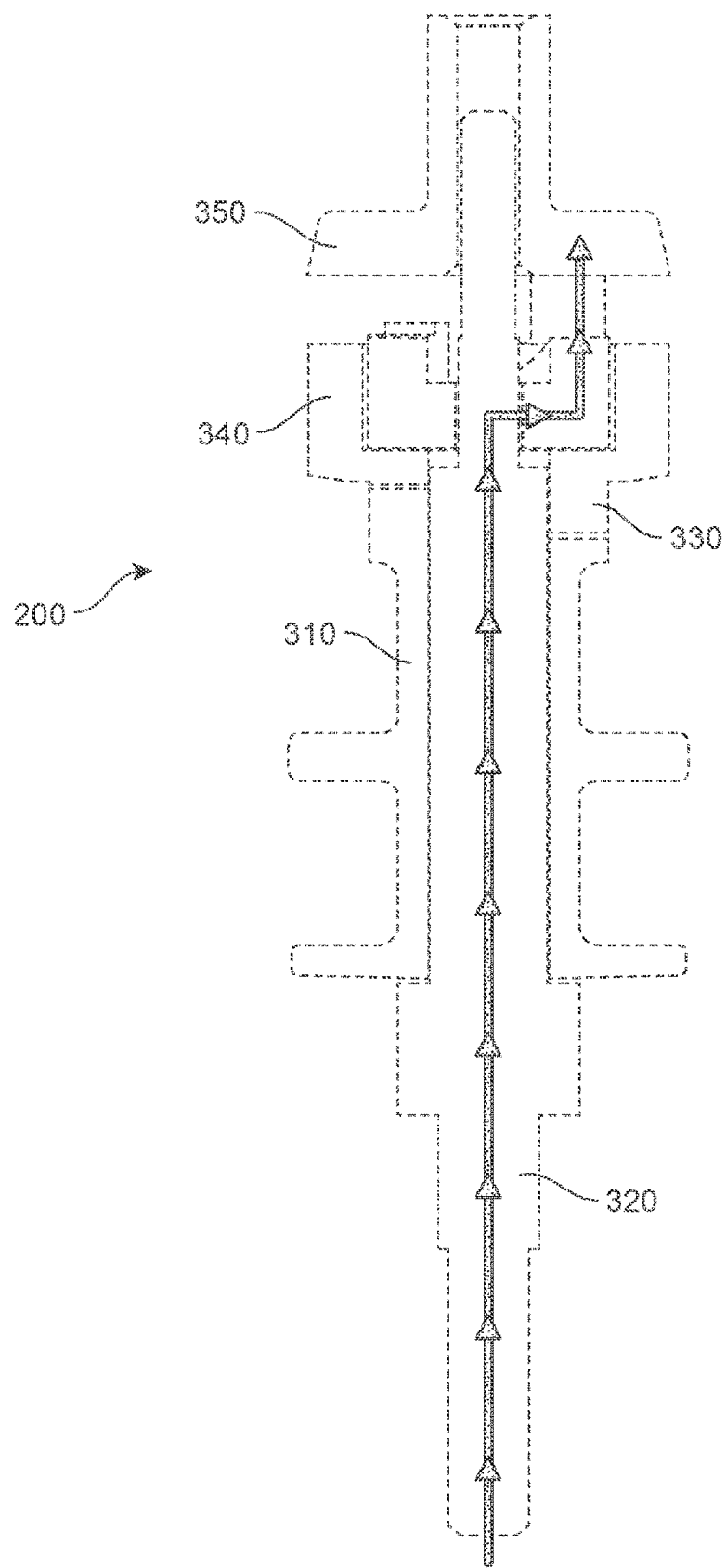
FIG. 11 is a schematic view of a power flow diagram, according to an embodiment.
Figure 12:
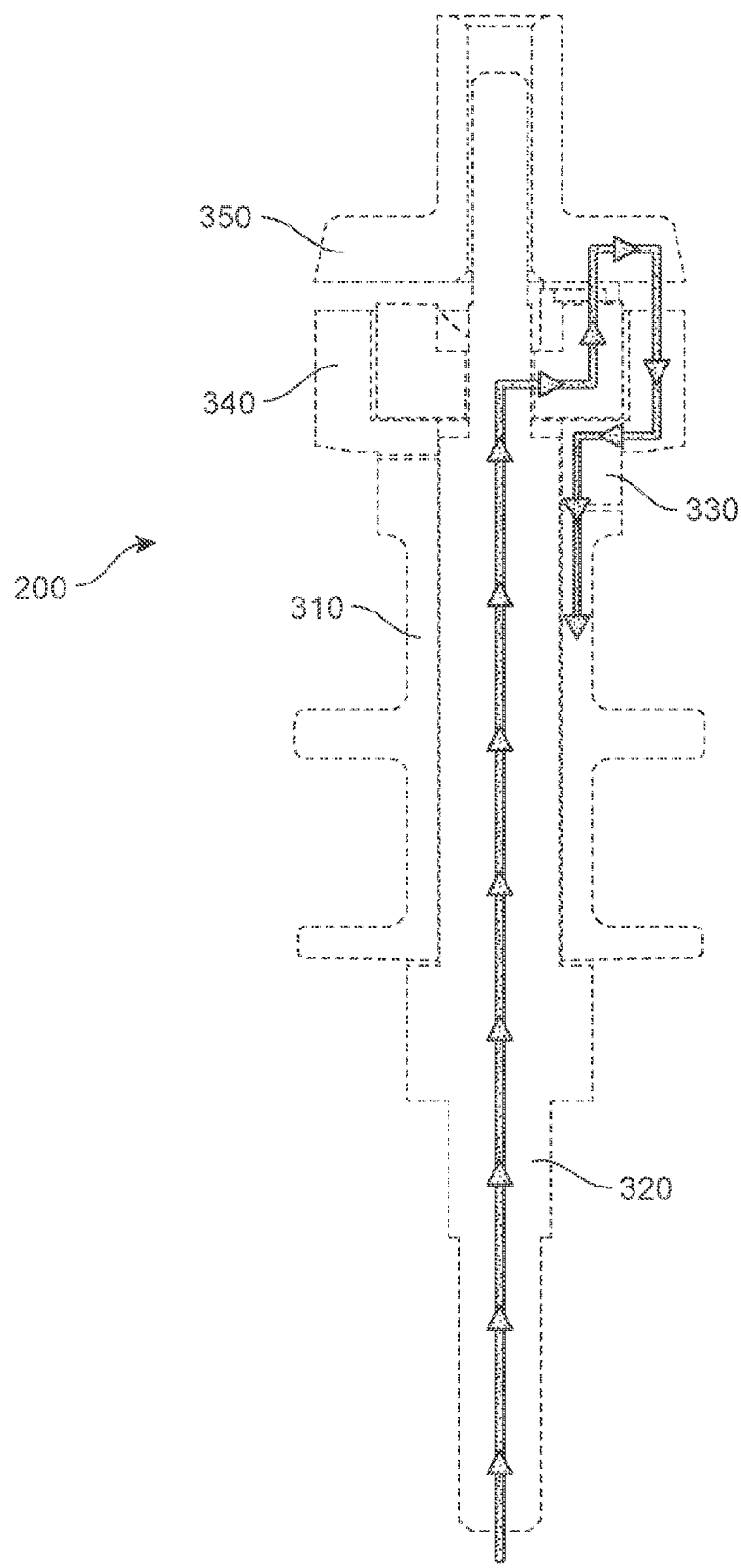
FIG. 12 is a schematic view of a power flow diagram, according to an embodiment.

In order to better understand the embodiments, FIG. 11 presents a schematic view of a power flow diagram depicting spool system 200 in a loosened or disengaged state, while FIG. 12 presents the same power flow diagram of the engaged state of FIG. 5 for comparison purposes. As indicated by the flow arrow in FIG. 11, in one embodiment, when a motor turns driveshaft 320 in a reverse direction relative to that of FIG. 12, torque is transmitted to cam 340 in the direction opposite to that of FIG. 12. In turn, cam 340 engages or transmits torque to engagement plate 350 in the same direction. Because engagement plate 350 is not positioned in mesh with spool extension 330, no power is applied to spool extension 330. In other words, both spool extension 330 and spool winding component 310 are free to move through the manipulation of tensile elements. Any tensile element associated with spool winding component 310 can be unwound and loosened as a result. Thus, in some embodiments, spool system 200 provides a quick release mechanism for a power driven spool that can be initiated by reverse rotation of the driveshaft. As described earlier, this system can comprise a compact internal cam-follower design that axially disengages the drive system from the spool and permits freewheeling to occur.

Figure 13:
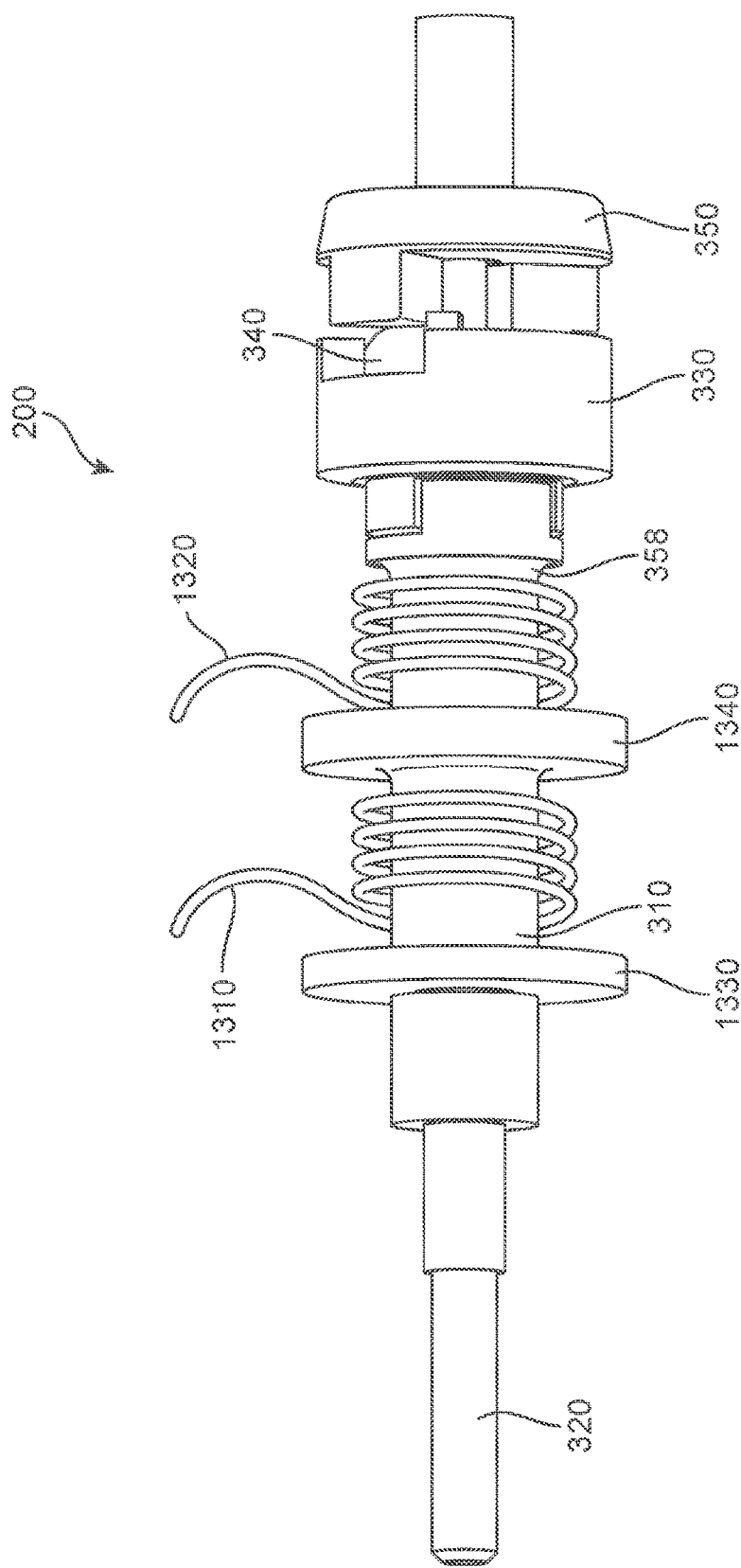
FIG. 13 is a schematic view of a lacing embodiment for a spool system.
Figure 14:
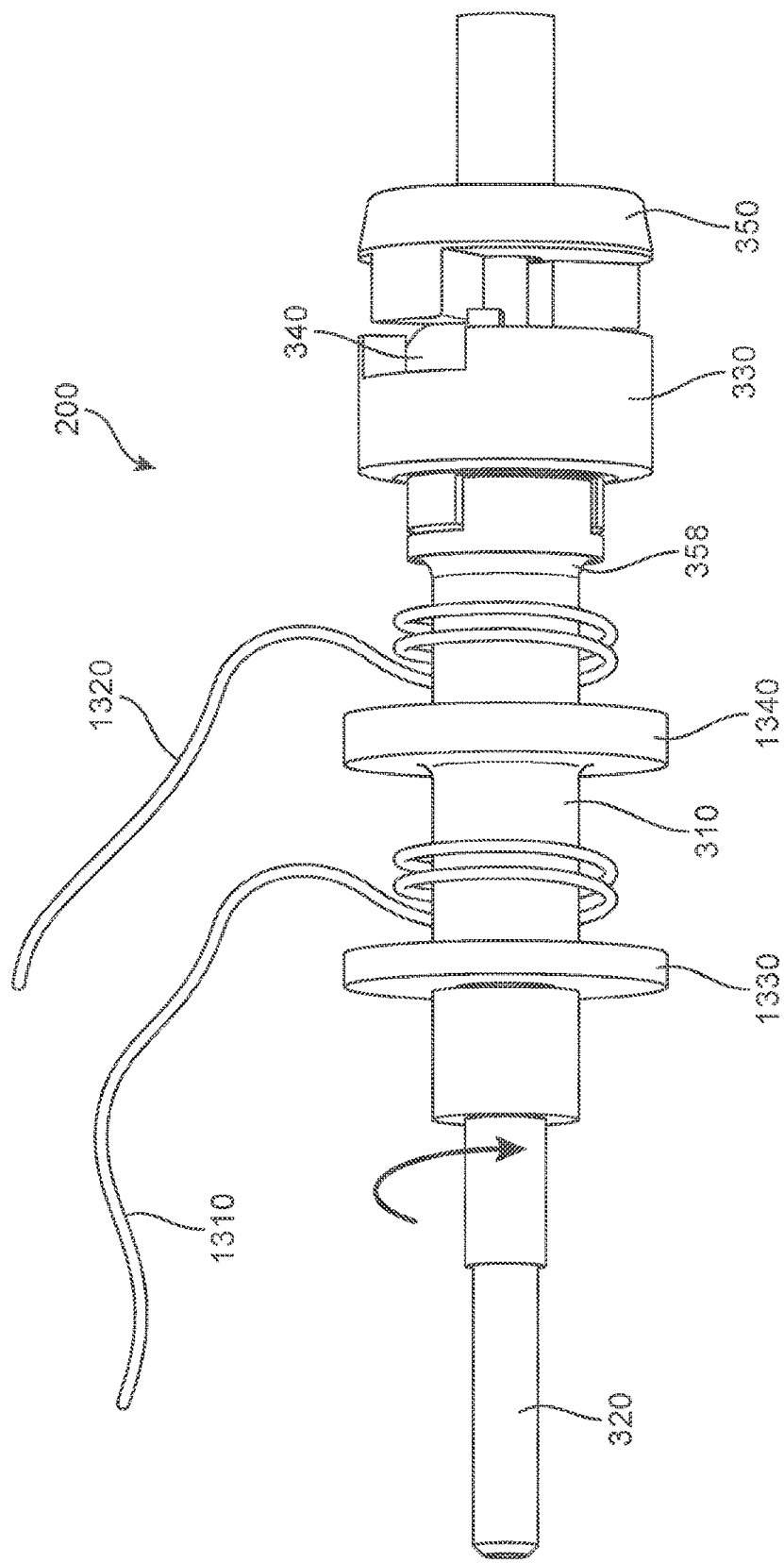
FIG. 14 is a schematic view of a lacing embodiment for a spool system.
Figure 15:
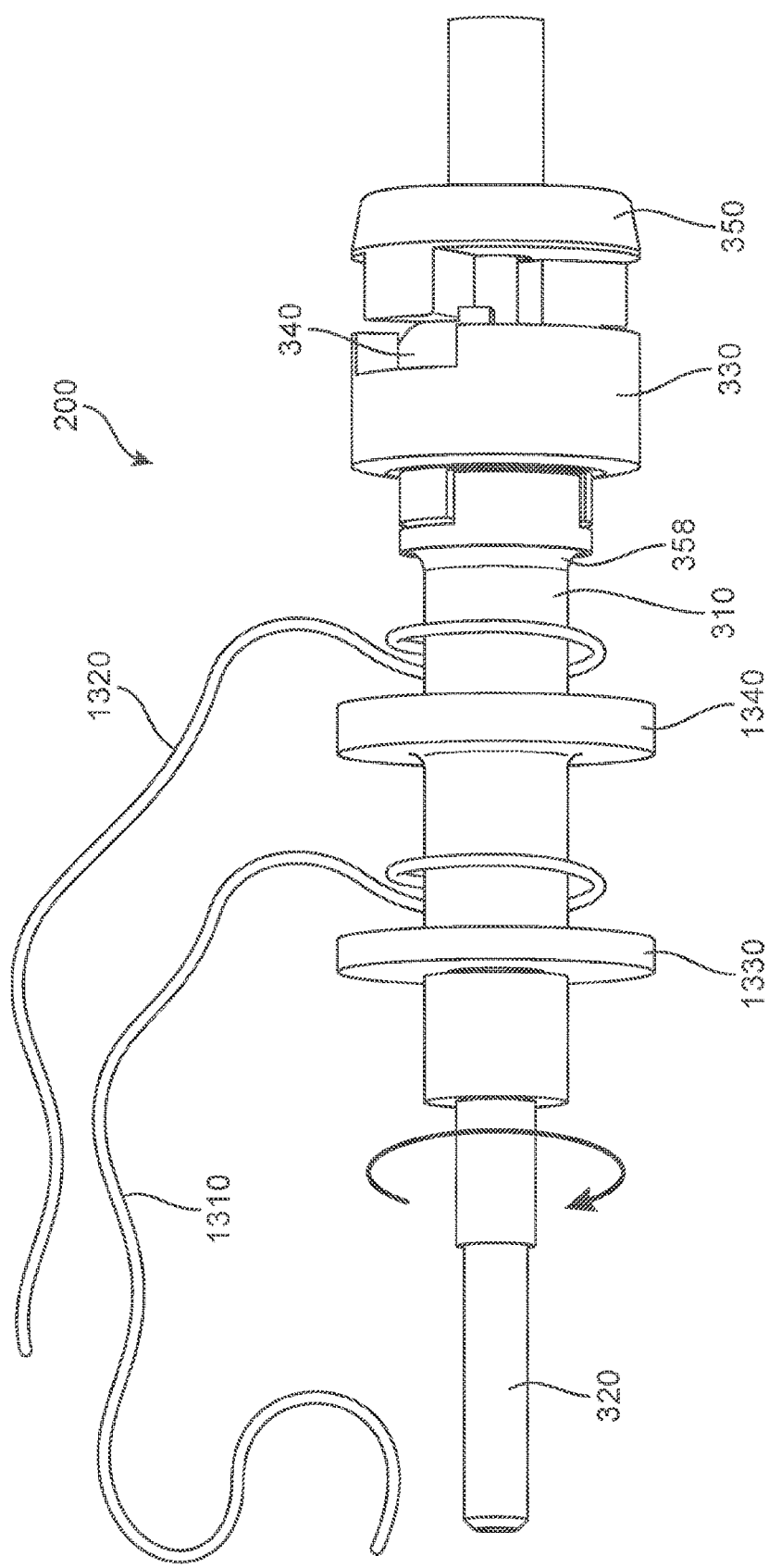
FIG. 15 is a schematic view of a lacing embodiment for a spool system.

Referring now to the sequence presented in FIGS. 13-15, it can be seen that in some embodiments, once spool system 200 is in the disengaged state, a user can easily pull a lace from spool winding component 310 to transition an article of footwear or other object to a fully loosened state. In other words, once spool winding component 310 is disengaged it can "freewheel". This occurs because there is no longer any tension in the system. Thus, a user can pull at the tensile element(s) associated with spool winding component 310 and spool winding component 310 can rapidly and freely unwind, without being encumbered by a drive system. In some embodiments, this type of system can be beneficial in helping to prevent "bird-nesting", which occurs when tensile elements become tangled or fouled together. In one embodiment, this feature allows a wearer to quickly open the shoe without having to reverse drive the motor. The disengaged state can also allow a user to quickly loosen an article of footwear and remove a foot from the article of footwear more rapidly.

In FIGS. 13-15, a first tensile element 1310 and a second tensile element 1320 are each wound around a portion of spool winding component 310. First tensile element 1310 is wound around a portion of spool winding component 310 bounded by a first raised portion 1330 and a second raised portion 1340, and second tensile element 1320 is wound around a portion of spool winding component 310 bounded by second raised portion 1340 and lip portion 358. Referring to FIG. 13, because spool system 200 is in the disengaged state, when an end of first tensile element 1310 and an end of second tensile element 1320 are pulled away from spool winding component 310, spool winding component 310 can rotate freely allowing the two tensile elements to unwind from spool winding component 310, as shown in FIG. 14. As the rotation continues, the two tensile elements continue to unwind until the system is fully loosened, as shown in FIG. 15.

A spool system as described above is not limited to articles of footwear and could be used with apparel, for example. As one particular example, a spool system can be utilized by a tensioning system that is used in adjusting a shoulder pad, worn by a user playing American football, where shoulder pads are common. However, other embodiments could use this adjustable shoulder pad configuration with any other kinds of clothing configured to be worn by players in any other sports, including, for example, hockey, lacrosse, as well as any other sports or activities requiring shoulder pads. Moreover, it should be understood that the principles discussed here can be used for adjusting any kinds of padding including, but not limited to elbow pads, knee pads, shin pads, padding associated with the hands and arms, padding associated with the feet and legs, padding associated with the torso, padding associated with the head as well as any other kind of padding known in the art.

In still other embodiments, a tensioning system including a motorized tensioning device as described herein can be used with any other kinds of apparel and/or sports equipment including, but not limited to backpacks, hats, gloves, shirts, pants, socks, scarves, jackets, as well as other articles. Other examples of articles include, but are not limited to: shin guards, knee pads, elbow pads, shoulder pads, as well as any other type of protective equipment. Additionally, in some embodiments, the flexible manufacturing system could be used with bags, duffel bags, purses, backpacks, luggage, various kinds of sportswear and/or sporting equipment.

While each of the components in the figures are not necessarily to scale, it should be noted that the illustrations presented in FIGS. 3 and 6-9 are to scale for the one embodiment disclosed in said figures. However, it should be understood that as noted earlier, in other embodiments the relative sizes and dimensions may differ from those illustrated in FIGS. 3 and 6-9 as shown and disclosed herein. In addition, in some other embodiments, the spool and spool extension may be formed integrally as one component, but comprise the same or a substantially similar unitary configuration as the two individually described and depicted components when joined together.

EXAMPLES

In Example 1, an article of footwear includes an upper, a sole structure, and a motorized tensioning device seated in the sole structure. The motorized tensioning device includes a cam device, a spool, a tensile element wound at least in part, around the spool, a driveshaft extending through the spool and coupled to the cam device to deliver torque to the cam device to cause the spool to turn to increase or decrease tension on the tensile element, and an engagement plate configured to engage with and receive torque from the cam device, couple to the spool in an engaged state to cause the spool to rotate with the drive shaft, and space apart from the spool in a disengaged state to cause the spool to rotate independently of the drive shaft.

In Example 2, the article of footwear of Example 1 optionally further includes that the cam device includes a step portion and the engagement plate comprises a first spoke portion, the first spoke portion configured to be flush against a first end of the step portion of the cam device when the spool system is in the disengaged state.

In Example 3, the article of footwear of any one or more of Examples 1 and 2 optionally further includes that the engagement plate further comprises a second spoke portion, the second spoke portion configured to be flush against a second end of the step portion of the cam device when the spool system is in the engaged state, the second end of the step portion being disposed on an opposite side of step portion relative to the first end.

In Example 4, the article of footwear of any one or more of Examples 1-3 optionally further includes that the second end of the step portion has a greater height than the first end of the step portion.

In Example 5, the article of footwear of any one or more of Examples 1-4 optionally further includes that the cam device further comprises a ramped edge extending circumferentially about a portion of the cam device from the first edge to the second edge.

In Example 6, the article of footwear of any one or more of Examples 1-5 optionally further includes that the ramped edge comprises a first linear portion joined to the first edge, a second linear portion joined to the second edge, and a slope portion between the first linear portion and the second linear portion.

In Example 7, the article of footwear of any one or more of Examples 1-6 optionally further includes that the first linear portion is disposed beneath the first spoke portion of the engagement plate in the disengaged state and describes a first height and the second linear portion is disposed beneath the second spoke portion in the engaged state and describes a second height greater than the first height.

In Example 8, the article of footwear of any one or more of Examples 1-7 optionally further includes that the tensile element is substantially wound around the spool when the article of footwear is under tension and substantially unwound from the spool when the article of footwear is loosened.

In Example 9, the article of footwear of any one or more of Examples 1-8 optionally further includes that the first tensile element can be freely unwound from the spool system in the disengaged state.

In Example 10, the article of footwear of any one or more of Examples 1-9 optionally further includes that the spool is substantially elongated and includes a substantially cylindrical shape, wherein the spool comprises an opening extending between a first spool end and a second spool end, and wherein the driveshaft extends through the opening.

In Example 11, the article of footwear of any one or more of Examples 1-10 optionally further includes that a first portion of the driveshaft extends axially outward from the second end of the spool, wherein the cam device surrounds the first portion.

In Example 12, the article of footwear of any one or more of Examples 1-11 optionally further includes that a second portion of the driveshaft extends axially outward from the first portion of the driveshaft, wherein the engagement plate surrounds the second portion.

In Example 13, the article of footwear of any one or more of Examples 1-12 optionally further includes that the motorized tensioning system and a motor assembly that is configured to transmit torque to the driveshaft are disposed in a housing, the housing seated in the sole structure.

In Example 14, a method of controlling, in an article of footwear, a motorized tensioning device having a spool, includes turning a driveshaft in a first direction, causing the driveshaft to turn a cam device in the first direction, causing a ramped edge of the cam device to push against a lower surface of an engagement plate such that a rotation of the cam device increases an axial distance between the cam device and the engagement plate, increasing the axial distance between the spool is coupled to the cam device and the engagement plate, thereby transitioning the spool system from an engaged state to a disengaged state, and in the disengaged state, imparting a force on one of an upper of the article of footwear and a tensile element of the article of footwear to freely unwind the tensile element around the spool.

In Example 15, the method of Example 14 optionally further includes turning a driveshaft in a second direction, the second direction being a direction opposite to that of the first direction, driveshaft turning a cam device in the second direction, and decreasing an axial distance between the cam device and the engagement plate, thereby transitioning the spool system from the disengaged state to the engaged state.

In Example 16, the method of any one or more of Examples 14 and 15 optionally further includes, in the engaged state, turning the spool in the second direction to wind the tensile element about the spool.

In Example 17, the method of any one or more of Examples 14-16 optionally further includes that the cam device includes a step portion and increasing the axial distance includes placing a first spoke portion of the engagement plate flush against a first end of the step portion of the cam device.

In Example 18, the method of any one or more of Examples 14-17 optionally further includes that the engagement plate further comprises a second spoke portion, wherein decreasing the axial distance includes placing the second spoke portion configured flush against a second end of the step portion of the cam device, the second end of the step portion being disposed on an opposite side of step portion relative to the first end.

In Example 19, the method of any one or more of Examples 14-18 optionally further includes that the second end of the step portion has a greater height than the first end of the step portion increasing the axial distance includes traversing, with the first spoke portion, a ramped edge of the cam device extending circumferentially about a portion of the cam device from the first edge to the second edge.

While various embodiments have been described, the description is intended to be exemplary rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. An article of footwear, comprising:
   an upper;
   a sole structure; and
   a motorized tensioning device seated in the sole structure and comprising:
   a cam device;
   a spool;
   a tensile element wound, at least in part, around the spool;
   a driveshaft extending through the spool and coupled to the cam device to deliver torque to the cam device to cause the spool to turn to increase or decrease tension on the tensile element; and
   an engagement plate configured to:
   engage with and receive torque from the cam device;
   couple to the spool in an engaged state to cause the spool to rotate with the drive shaft; and
   space apart from the spool in a disengaged state to cause the spool to rotate independently of the drive shaft;
   wherein the cam device further comprises one ramped edge extending circumferentially about a substantial majority of a circumference of the cam device from a first edge of the cam device to a second edge of the cam device.

2. The article of footwear of claim 1, wherein:
   the cam device includes a step portion; and
   the engagement plate comprises a first spoke portion, the first spoke portion configured to be flush against a first end of the step portion of the cam device when the spool system is in the disengaged state.

3. The article of footwear of claim 2, wherein the engagement plate further comprises a second spoke portion, the second spoke portion configured to be flush against a second end of the step portion of the cam device when the spool system is in the engaged state, the second end of the step portion being disposed on an opposite side of step portion relative to the first end.

4. The article of footwear of claim 3, wherein the second end of the step portion has a greater height than the first end of the step portion.

5. The article of footwear of claim 1, wherein the ramped edge comprises a first linear portion joined to the first edge, a second linear portion joined to the second edge, and a slope portion between the first linear portion and the second linear portion.

6. The article of footwear of claim 5, wherein the first linear portion is disposed beneath the first spoke portion of the engagement plate in the disengaged state and describes a first height and the second linear portion is disposed beneath the second spoke portion in the engaged state and describes a second height greater than the first height.

7. The article of footwear of claim 1, wherein the tensile element is substantially wound around the spool when the article of footwear is under tension and substantially unwound from the spool when the article of footwear is loosened.

8. The article of footwear of claim 1, wherein the first tensile element can be freely unwound from the spool system in the disengaged state.

9. The article of footwear of claim 1, wherein a second portion of the driveshaft extends axially outward from the first portion of the driveshaft, wherein the engagement plate surrounds the second portion.

10. The article of footwear of claim 1, wherein the motorized tensioning system and a motor assembly that is configured to transmit torque to the driveshaft are disposed in a housing, the housing seated in the sole structure.

11. The article of footwear of claim 1, wherein the spool is substantially elongated and includes a substantially cylindrical shape, wherein the spool comprises an opening extending between a first spool end and a second spool end, and wherein the driveshaft extends through the opening.

12. The article of footwear of claim 11, wherein a first portion of the driveshaft extends axially outward from the second end of the spool, wherein the cam device surrounds the first portion.

13. A method of controlling, in an article of footwear, a motorized tensioning device having a spool, the method comprising:
  turning a driveshaft in a first direction, causing the driveshaft to turn a cam device in the first direction, causing a ramped edge of the cam device to push against a lower surface of an engagement plate such that a rotation of the cam device increases an axial distance between the cam device and the engagement plate;
  increasing the axial distance between the spool is coupled to the cam device and the engagement plate, thereby transitioning the spool system from an engaged state to a disengaged state; and
  in the disengaged state, imparting a force on one of an upper of the article of footwear and a tensile element of the article of footwear to freely unwind the tensile element around the spool;
  wherein the cam device further comprises one ramped edge extending circumferentially about a substantial majority of a circumference of the cam device from a first edge of the cam device to a second edge of the cam device.

14. The method of claim 13, further comprising:
  turning a driveshaft in a second direction, the second direction being a direction opposite to that of the first direction, the driveshaft turning a cam device in the second direction; and
  decreasing an axial distance between the cam device and the engagement plate, thereby transitioning the spool system from the disengaged state to the engaged state.

15. The method of claim 14, further comprising, in the engaged state, turning the spool in the second direction to wind the tensile element about the spool.

16. The method of claim 14, wherein:
  the cam device includes a step portion; and
  increasing the axial distance includes placing a first spoke portion of the engagement plate flush against a first end of the step portion of the cam device.

17. The method of claim 16, wherein the engagement plate further comprises a second spoke portion, wherein decreasing the axial distance includes placing the second spoke portion configured flush against a second end of the step portion of the cam device, the second end of the step portion being disposed on an opposite side of step portion relative to the first end.

18. The article of footwear of claim 17, wherein the second end of the step portion has a greater height than the first end of the step portion increasing the axial distance includes traversing, with the first spoke portion.

19. The method of claim 18, wherein the cam device further comprises a ramped edge extending circumferentially about a portion of the cam device from the first edge to the second edge.

20. The method of claim 19, wherein the ramped edge comprises a first linear portion joined to the first edge, a second linear portion joined to the second edge, and a slope portion between the first linear portion and the second linear portion.

21. The method of claim 20, wherein the first linear portion is disposed beneath the first spoke portion of the engagement plate in the disengaged state and describes a first height and the second linear portion is disposed beneath the second spoke portion in the engaged state and describes a second height greater than the first height.

* * * * *

UNITED STATES PATENT AND TRADEMARK OFFICE
CERTIFICATE OF CORRECTION

PATENT NO. : 11,844,402 B2
APPLICATION NO. : 17/480637
DATED : December 19, 2023
INVENTOR(S) : Beers et al.

It is certified that error appears in the above-identified patent and that said Letters Patent is hereby corrected as shown below:

In the Claims

In Column 20, Line 13, in Claim 18, delete "article of footwear" and insert --method-- therefor Signed and Sealed this
Twenty-seventh Day of August, 2024

Katherine Kelly Vidal
*Director of the United States Patent and Trademark Office*